(12) United States Patent
Koreeda et al.

(10) Patent No.: US 7,433,291 B2
(45) Date of Patent: Oct. 7, 2008

(54) OBJECTIVE LENS

(75) Inventors: Daisuke Koreeda, Saitama-ken (JP); Koichi Maruyama, Tokyo (JP); Shuichi Takeuchi, Saitama-ken (JP)

(73) Assignee: Hoya Corporation, Tokyo (JP)

( * ) Notice: Subject to any disclaimer, the term of this patent is extended or adjusted under 35 U.S.C. 154(b) by 451 days.

(21) Appl. No.: 10/956,132

(22) Filed: Oct. 4, 2004

(65) Prior Publication Data

US 2005/0073937 A1    Apr. 7, 2005

(30) Foreign Application Priority Data

Oct. 3, 2003    (JP) .............................. 2003-345897

(51) Int. Cl.
*G11B 7/00*    (2006.01)

(52) U.S. Cl. .............................. 369/112.23; 369/112.08

(58) Field of Classification Search ........................ None
See application file for complete search history.

(56) References Cited

U.S. PATENT DOCUMENTS

| | | | |
|---|---|---|---|
| 5,724,335 A | 3/1998 | Kobayashi | |
| 5,986,779 A | 11/1999 | Tanaka et al. | |
| 6,366,542 B1 * | 4/2002 | Kojima et al. | 369/44.23 |
| 6,473,387 B1 | 10/2002 | Maruyama et al. | |
| 6,741,539 B2 | 5/2004 | Maruyama | |
| 6,781,764 B1 * | 8/2004 | Takeuchi et al. | 359/629 |
| 6,785,203 B2 | 8/2004 | Maruyama et al. | |
| 2004/0246873 A1 * | 12/2004 | Maruyama et al. | 369/112.03 |
| 2005/0002118 A1 * | 1/2005 | Maruyama et al. | 359/719 |
| 2005/0078593 A1 * | 4/2005 | Maruyama et al. | 369/112.23 |

FOREIGN PATENT DOCUMENTS

| | | |
|---|---|---|
| JP | 9-179021 | 7/1997 |
| JP | 2001-76367 | 3/2001 |
| JP | 2001-243651 | 9/2001 |

* cited by examiner

*Primary Examiner*—Joseph Feild
*Assistant Examiner*—Parul Gupta
(74) *Attorney, Agent, or Firm*—Greenblum & Bernstein, P.L.C.

(57) ABSTRACT

An objective lens used for recording data to and/or reproducing data from a plurality of types of optical discs having different thicknesses of cover layers. The objective lens satisfies a condition $0.02 < M2 - M1 < 0.15$, where M1 represents a magnification of the objective lens when recording/reproducing for a first optical disc is performed using the first light beam, and M2 represents a magnification of the objective lens when the recording/reproducing for a second optical disc is performed using the second light beam. Further, at least one of lens surfaces of the objective lens is provided with a diffracting structure having a plurality of annular zones configured to correct spherical aberrations for both of the first and second optical discs.

14 Claims, 14 Drawing Sheets

OBJECTIVE LENS

BACKGROUND OF THE INVENTION

The present invention relates to an objective lens which is used or recording data to and/or reproducing data from a plurality of types of optical discs having different data recording densities and cover layer thicknesses.

There exist a plurality of types of standards regarding optical discs having different data recording densities and different thicknesses of cover layers (protective layers). For instance, DVD (Digital Versatile Disc) has higher data recording density than that of CD (Compact Disc) and has a thinner cover layer than that of CD. Therefore, when the objective lens is used for the plurality of types of optical discs, a proper beam spot corresponding to the data recording density of an optical disc being used has to be formed on the optical disc by changing NA (Numerical Aperture) of a light beam while properly correcting spherical aberration which changes depending on the thickness of the cover layer.

For example, for recording/reproducing operation of the optical disc having a relatively thinner cover layer and higher data recording density, the NA has to be increased in comparison with the NA of an optical system designed specifically for the optical disc having a relatively thick cover layer and lower data recording density. Since the beam spot diameter gets smaller as a wavelength of the beam gets shorter, a laser light source of an oscillation wavelength of 635-665 nm is used for an optical system for DVD. The wavelength for DVD is shorter than that (780-830 nm) of the optical system for CD. Therefore, optical devices of recent years used for recording data to and/or reproducing data from the plurality of types of optical discs are generally equipped with a light source unit capable of emitting laser beams of different wavelengths.

Objective lenses used for properly converging the laser beam on data recording surfaces of the plurality of types of optical discs having different cover layer thicknesses are disclosed in the following publications.

Japanese Patent Provisional Publication No. 2001-243651 (hereinafter referred to as "document #1") discloses an objective lens configured to have a diffracting structure having a plurality of annular zones with small steps on one surface of the objective lens. Two types of collimated beams having different wavelengths are used to be incident on the objective lens.

Also, each of Japanese Patent Provisional Publication No. HEI09-179021 (hereinafter referred to as "document #2") and Japanese Patent Provisional Publication No. 2001-76367 (hereinafter referred to as "document #3") discloses a configuration of an optical system in which two types of beams of different wavelengths are switched and used for two types of optical discs, similarly to the configuration disclosed in the document #1.

In the optical system disclosed in the document #2, a collimated beam is incident on the objective lens when the optical disc of higher data recording density (e.g., DVD) is used, while a diverging beam is incident on the objective lens when the optical disc of lower data recording density (e.g., CD) is used. In the optical system disclosed in the document #3, a diverging angle of a diverging beam incident on the objective lens, which has a surface on which a diffracting structure having a plurality of annular zones with small steps, is set smaller in the recording/reproducing operation of CD than in the recording/reproducing operation of DVD.

Incidentally, the objective lens, used for recording data to and/or reproducing data from the plurality of types of optical discs, is required not only to correct the aforementioned spherical aberration but also to satisfactorily correct a coma which occurs when the beam is obliquely incident upon the objective lens with respect to an optical axis of the objective lens, in converging each laser beam (corresponding to each optical disc) on the data recording surface of each optical disc. However, in cases where the same magnification of the objective lens is employed for both of the DVD and CD (as in the document #1) or a magnification of the objective lens in use of the CD is smaller than a magnification of the objective lens in use of the DVD (as in the document #2), it is difficult to satisfactorily suppress the coma (occurring when the beam is obliquely incident upon the objective lens with respect to the optical axis) for each of the optical discs.

For this reason, in the conventional optical device, the objective lens is configured only to achieve a balance between comas occurring in use of optical discs of different types, depending on the purpose of the optical device. Specifically, the tolerance for aberrations becomes lower in the recording/reproducing operation for the DVD having higher data recording density. Thus, in many cases, the objective lens is designed to reduce the coma in use of the DVD as much as possible even if the coma in use of the CD increases to some extent. In the optical device disclosed in the document #3, a distance between a light source and a disc surface of the CD and a distance between the light source and a disc surface of the DVD are set equal to each other, and a magnification in use of the CD is slightly larger than that in use of the DVD. With this structure, the amount of coma can be corrected to some extent for each of the optical discs. However, the coma can not be suppressed effectively since a difference between the magnifications in use of the CD and DVD is small.

Thus, an objective lens that is capable of improving performance for recording data to and/or reproducing data from the plurality of types of optical discs is desired.

SUMMARY OF THE INVENTION

The present invention is advantageous in that it provides an objective lens capable of forming a suitable beam spot on a data recording surface of each of a plurality of types of optical discs while satisfactorily suppressing a coma (occurring when a beam is obliquely incident on the objective lens with respect to the optical axis) regardless of which of the plurality of types of optical discs is used.

According to an aspect of the invention, there is provided an objective lens used for recording data to and/or reproducing data from a plurality of types of optical discs having different thicknesses of cover layers. The plurality of types of optical discs includes a first optical disc and a second optical disc having a cover layer thicker than that of the first optical disc. A first light beam is used for recording or reproducing operation for the first optical disc, and a second light beam is used for recording or reproducing operation for the second optical disc. A wavelength of the second light beam is longer than that of the first light beam. The objective lens satisfies a condition:

$$0.02 < M2 - M1 < 0.15 \qquad (1)$$

where M1 represents a magnification of the objective lens when the recording or reproducing operation for the first optical disc is performed using the first light beam, and M2 represents a magnification of the objective lens when the recording or reproducing operation for the second optical disc is performed using the second light beam. Further, at least one of lens surfaces of the objective lens is provided with a diffracting structure having a plurality of annular zones configured to correct spherical aberrations for both of the first and second optical discs.

With this configuration, both of a coma caused when the first optical disc is used and a coma caused when the second optical disc is used can be suppressed satisfactorily.

According to another aspect of the invention, there is provided an optical pick-up including light sources and an objective lens used for recording data to and/or reproducing data from a plurality of types of optical discs having different thicknesses of cover layers. The plurality of types of optical discs includes a first optical disc and a second optical disc having a cover layer thicker than that of the first optical disc. The light sources emits a first light beam used for recording or reproducing operation for the first optical disc, and a second light beam used for recording or reproducing operation for the second optical disc. A wavelength of the second light beam is longer than that of the first light beam.

In this structure, the objective lens is located to satisfy a condition:

$$0.02 < M2 - M1 < 0.15 \quad (1)$$

where M1 represents a magnification of the objective lens when the recording or reproducing operation for the first optical disc is performed using the first light beam, and M2 represents a magnification of the objective lens when the recording or reproducing operation for the second optical disc is performed using the second light beam. At least one of lens surfaces of the objective lens includes a diffracting structure having a plurality of annular zones configured to correct spherical aberrations for both of the first and second optical discs.

With this configuration, both of a coma caused when the first optical disc is used and a coma caused when the second optical disc is used can be suppressed satisfactorily.

With regard to the above mentioned two aspects of the invention, the objective lens may satisfy a condition:

$$0.03 < f \times (M2 - M1) < 0.43 \quad (2)$$

where f represents a focal length of the objective lens when the recording or reproducing operation for the first optical disc is performed using the first light beam.

Still optionally, the at least one of lens surfaces of the objective lens may include an inner area for attaining a numerical aperture required for the recording or reproducing operation of the second optical disc, and an outer area for attaining a numerical aperture required for the recording or reproducing operation of the first optical disc, the outer area being located outside the inner area. In this case, the diffracting structure formed on the inner and outer areas of the at least one of lens surfaces of the objective lens satisfies a condition:

$$-0.35 < \frac{(\Phi 2 - \Phi 1) \times (\lambda 2 - \lambda 1)}{\{(M2 - M1) + 0.28 \times (t2 - t1)/f\} \times NA1^4} < -0.03 \quad (3)$$

where $\Phi 1$ denotes an additional optical path length of a high order component at an innermost part of the outer area of the diffracting structure, $\Phi 2$ denotes an additional optical path length of a high order component at a maximum effective radius of the diffracting structure, $\lambda 1$ denotes the wavelength of the first light beam, $\lambda 2$ denotes the wavelength of the second light beam, NA1 denotes a design numerical aperture which is required of the objective lens when the first optical disc is used, t1 denotes a thickness of the first optical disc, t2 denotes a thickness of the second optical disc, and f denotes a focal length of the objective lens.

Still optionally, the objective lens may satisfy the condition (1) when a converging beam is incident thereon for the recording or reproducing operation of the second optical disc.

Still optionally, the objective lens may satisfy the condition (1) when a substantially collimated beam is incident thereon for the recording or reproducing operation of the first optical disc.

Alternatively, the objective lens may satisfy the condition (1) when a diverging beam is incident thereon for the recording or reproducing operation of the first optical disc.

In a particular case, the objective lens may satisfy the condition (1) when a diverging beam is incident thereon for the recording or reproducing operation of the first optical disc and a substantially collimated beam is incident thereon for the recording or reproducing operation of the second optical disc.

BRIEF DESCRIPTION OF THE ACCOMPANYING DRAWINGS

The objects and features of the present invention will become more apparent from the consideration of the following detailed description taken in conjunction with the accompanying drawings, in which.

DETAILED DESCRIPTION OF THE EMBODIMENTS

Figure 1A:
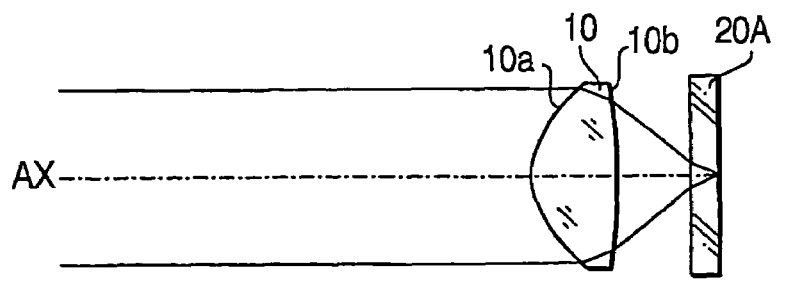
FIG. 1A shows an objective lens according to an embodiment and a first optical disc with regard to an optical path for the first optical disc.

Referring now to the drawings, a description will be given in detail of preferred embodiments in accordance with the present invention.

Hereafter, an objective lens 10 according to the embodiment of the invention will be described. The objective lens 10 is used in an optical device for recording data to and/or reproducing data from a plurality of types of optical discs. In the following, a configuration of the objective lens 10 is explained in detail with regard to use of a first optical disc 20A and a second optical disc 20B.

Figure 39:
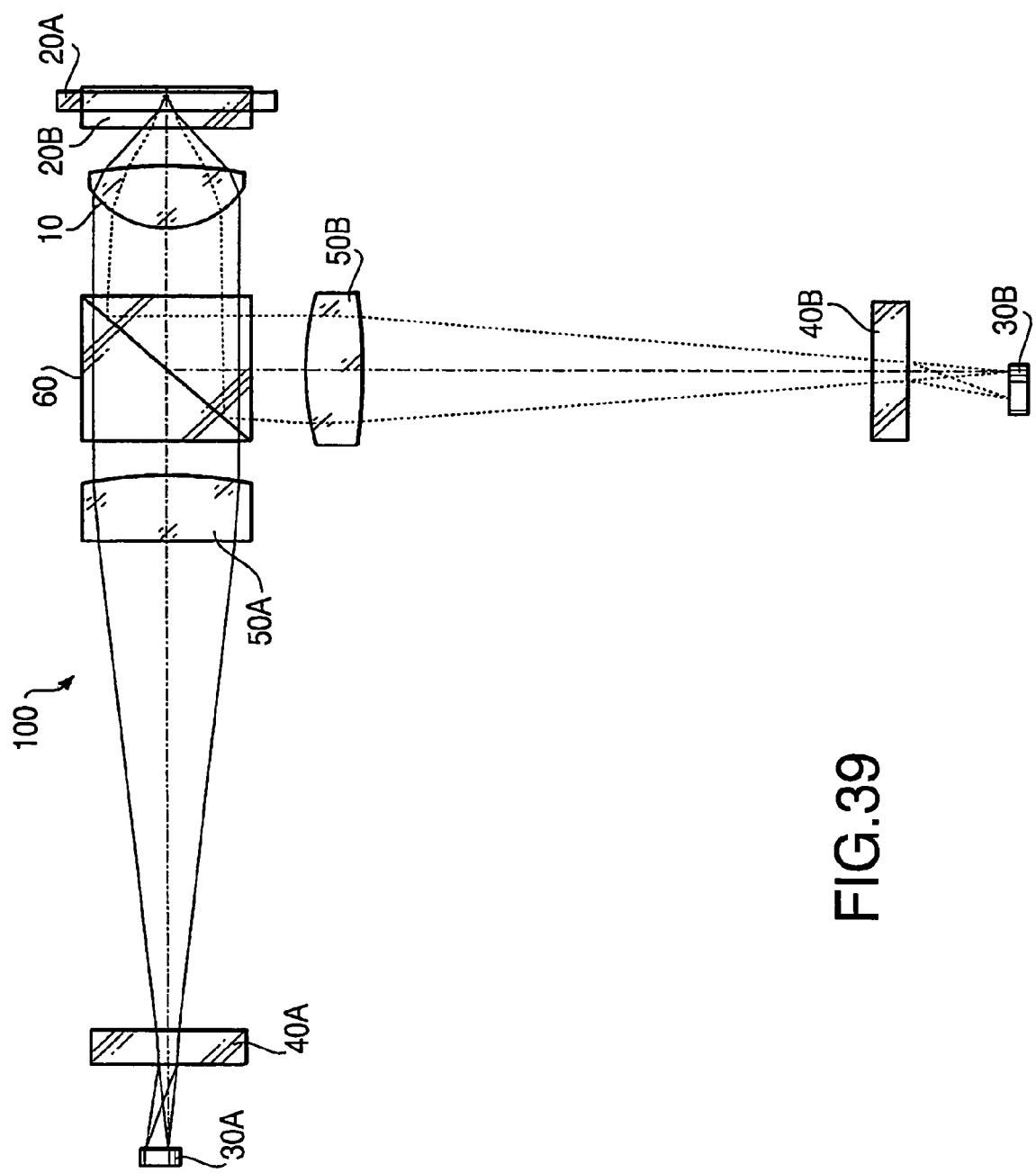
FIG. 39 is a block diagram of an optical pick-up according to the embodiment.

Before explanations of the objective lens 10, an example of a configuration of an optical pick-up which employs the objective lens 10 and is provided in the optical device for recording data to and/or reproducing data from the plurality of types of optical discs will be described with reference to FIG. 39. As shown in FIG. 39, an optical pick-up 100 includes light sources 30A and 30B which emits laser beams respectively corresponding to the optical discs 20A and 20B.

The laser beam emitted by the light source 30A passes through a cover glass 40A, is converged by a coupling lens 50A, and then is incident on the objective lens 10 through a beam splitter 60. Also, the laser beam emitted by the light source 30B passes through a cover glass 40B, is converged by a coupling lens 50B, and then is incident on the objective lens 10 through the beam splitter 60. As described in detail below, the objective lens 10 converges the incident laser beam onto a data recording surface of the corresponding optical disc.

The first optical disc 20A is an optical disc having a thin cover layer and high data recording density (e.g., DVD), and the second optical disc 20B is an optical disc having a thick cover layer and low data recording density (e.g., CD and CD-R). That is, the data recording density of the first optical disc 20A is higher than that of the second optical disc 20B, and the thickness of a cover layer of the first optical disc 20A is smaller than that of the second optical disc 20B. The optical disc 20A or 20B is set on a turntable in the optical device (not shown in FIG. 1) and thereby rotated.

Figure 1B:
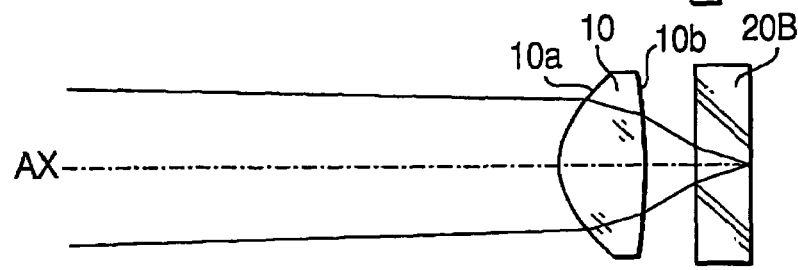
FIG. 1B shows the objective lens and a second optical disc with regard to an optical path for the second optical disc.

FIG. 1A shows the objective lens 10 and the first optical disc 20A with regard to an optical path for the first optical disc 20A in the optical pick-up 100, and FIG. 1B shows the objective lens 10 and the second optical disc 20B with regard to an optical path for the second optical disc 20B in the optical pick-up 100.

For recording/reproducing operation for the first optical disc 20A having the higher data recording density, a laser beam having a short wavelength (e.g., 657 nm) (hereinafter, referred to as a first laser beam) is emitted by the light source 30A in order to form a beam spot of a small diameter on the data recording surface of the first optical disc 20A.

Meanwhile, for the recording/reproducing operation for the second optical disc 20B having the lower data recording density, a laser beam having a wavelength longer than that of the first laser beam (hereinafter, referred to as a second laser beam) is emitted by the light source 30B in order to form a beam spot of a relatively large diameter on the data recording surface of the second optical disc 20B. That is, the diameter of the beam spot formed on the first optical disc 20A is smaller than that formed on the second optical disc 20B.

In an optical system of the optical disc drive, coupling lenses (i.e., the coupling lenses 50A and 50B) are provided to convert the first laser beam emitted by the light source 30A to a collimated beam and to convert the second laser beam emitted by the light source 30B to a converging beam. The collimated beam (the first laser beam) is converged by the objective lens 10 onto the data recording surface of the optical disc 20A (see FIG. 1A). The converging beam (the second laser, beam) is converged by the objective lens 10 onto the data recording surface of the second optical disc 20B (see FIG. 1B).

With regard to magnification of the objective lens 10, the objective lens 10 is configured to satisfy the following condition (1):

$$0.02 < M2 - M1 < 0.15 \quad (1)$$

where M1 denotes the magnification of the objective lens 10 in the recording/reproducing operation of the first optical disc 20A, and M2 denotes the magnification of the objective lens 10 in the recording/reproducing operation of the second optical disc 20B. Thus, the degree of divergence (convergence) of the beam incident upon the objective lens 10 is changed depending on the type of the optical disc being used. By such a configuration, the coma, which occurs on the data recording surface of each optical disc and is caused by the oblique incidence of the beam on the objective lens 10 with respect to an optical axis of the objective lens, is suppressed satisfactorily.

Both the coma caused when the first optical disc 20A is used and the coma caused when the second optical disc 20B is used can be suppressed satisfactorily by configuring the objective lens 10 to satisfy the condition (1). In other words, the magnification of the objective lens 10 in the use of the second optical disc 20B having the relatively thicker cover layer is set larger than the magnification in the use of the first optical disc 20A having the relatively thinner cover layer so that a difference between the magnifications satisfies the condition (1).

As described above, by such a configuration, the coma occurring on the data recording surface due to the oblique incidence of the beam on the objective lens 10 with respect to the optical axis is suppressed efficiently for both of the optical discs of different standards (i.e., the first optical disc 20A and the second optical disc 20B). Further, by providing a diffracting structure to at least one surface of the objective lens 10 satisfying the condition (1) as will be described below, the spherical aberration occurring when each of the first and second laser beams passing through the objective lens 10 is converged onto the data recording surface of each optical disc 20A, 20B is corrected satisfactorily. Therefore, by use of the objective lens 10 of the embodiment, high precision recording/reproducing operation can be accomplished for the plurality of types of optical discs.

In a state in which the coma occurring when the first optical disc 20A is used is well suppressed, if the above magnification difference M2−M1 exceeds the upper limit of the condition (1), the correction of the coma for the second optical disc 20B becomes excessive and the coma occurs in the opposite direction. Further, the magnification difference M2−M1 exceeding the upper limit can lead to a too short working distance from the objective lens 10 to the optical disc (especially, the second optical disc 20B), which might cause contact of the objective lens with the optical disc in focusing operation (i.e., damage to the lens or the disc, malfunction, etc.). On the other hand, if the magnification difference M2−M1 falls below the lower limit of the condition (1), the correction to the coma occurring in the use of the second optical disc 20B becomes insufficient.

There are two or more combination patterns of the magnification m1 in the use of the first optical disc 20A and the magnification m2 in the use of the second optical disc 20B for satisfying the condition (1): setting M1 and M2 to 0 and a positive value (a value lager than 0) respectively, setting M1 and M2 to a negative value (a value smaller than 0) and 0 respectively, etc.

Among the above combination patterns, when the magnification M2 of the objective lens 10 for the recording/reproducing operation of the second optical disc 20B is set to 0 or less, that is, when the second laser beam incident on the objective lens 10 in the use for the second optical disc 20B is a diverging beam or a collimated beam, the magnification M1 in the use of the first optical disc 20A (negative) is required to have a large absolute value to satisfy the condition (1), by which occurrence of a tracking shift of the objective lens 10 in the use for the first optical disc 20A might result in large astigmatism.

To avoid such a problem, it is preferable that the magnification M2 of the objective lens 10 is set to a positive value (i.e., to configure the objective lens 10 so that the second laser beam incident thereon in the use of the second optical disc 20B is a converging beam). By such a configuration, the magnification M1 in the use of the first optical disc 20A can be kept low in the absolute value and thereby it becomes possible to correct the coma excellently while reducing the astigmatism.

In examples shown in FIGS. 1A and 1B, the magnification M1 is set to 0 when the first optical disc 20A (having a low tolerance for aberrations due to its high data recording density) is used. The magnification M1=0 means that the beam incident upon the objective lens 10 is the collimated beam. By letting the collimated beam enter the objective lens 10 as above, almost no coma occurs even if the objective lens 10 is shifted in a radial direction of the optical disc for the tracking operation.

Meanwhile, when the second optical disc 20B (having a relatively high tolerance for aberrations due to its lower data recording density in comparison with the first optical disc 20A) is used, the magnification M2 is set to a positive value while satisfying the condition (1). The magnification M2>0 means that the beam incident upon the objective lens 10 is a converging beam.

More specifically, the magnifications M1 and M2 for satisfactorily correcting the coma occurring in the use of each optical disc may be determined by use of a focal length f of the objective lens 10, as follows:

$$0.03 < f \times (M2-M1) < 0.43 \qquad (2)$$

Incidentally, the focal length f in the condition (2) is the focal length of the objective lens 10 when the recording/reproducing operation for the optical disc using the first laser beam is performed. According to the condition (2), it is desirable that the magnification difference M2−M1 is set smaller as the focal length f gets longer. If the value f×(M2−M1) calculated for the condition (2) exceeds the upper limit of the condition (2), the correction of the coma in the use of the second optical disc 20B becomes excessive and the coma occurs in the opposite direction.

Further, the working distance from the objective lens to the optical disc (especially, to the second optical disc 20B) tends to be too short and contact of the objective lens (in focusing, etc.) with the optical disc might be caused. On the other hand, if the value f×(M2−M1) falls below the lower limit of the condition (2), the correction to the coma occurring in the use of the second optical disc 20B becomes insufficient. By configuring the objective lens 10 to have the magnifications M1 and M2 obtained from its focal length as above, the coma correction effect can be enhanced further.

The objective lens 10 has a first surface 10a (on its light source side) and a second surface 10b (on its optical disc side). As shown in FIG. 1, the objective lens 10 is a biconvex single lens made of plastic, with the first and second surfaces 10a and 10b both formed aspherical. As mentioned above, the cover layer thickness differs between the first optical disc 20A and the second optical disc 20B and thus the spherical aberration changes depending on the type of the optical disc being used.

Therefore, at least one surface of the objective lens 10 of this embodiment is provided with a diffracting structure having a plurality of annular zones (having small steps) concentrically formed about the optical axis of the objective lens 10, so that the aberration is suppressed satisfactorily. In this embodiment, the diffracting structure is provided to the first surface 10a of the objective lens 10, for example.

Figure 38:
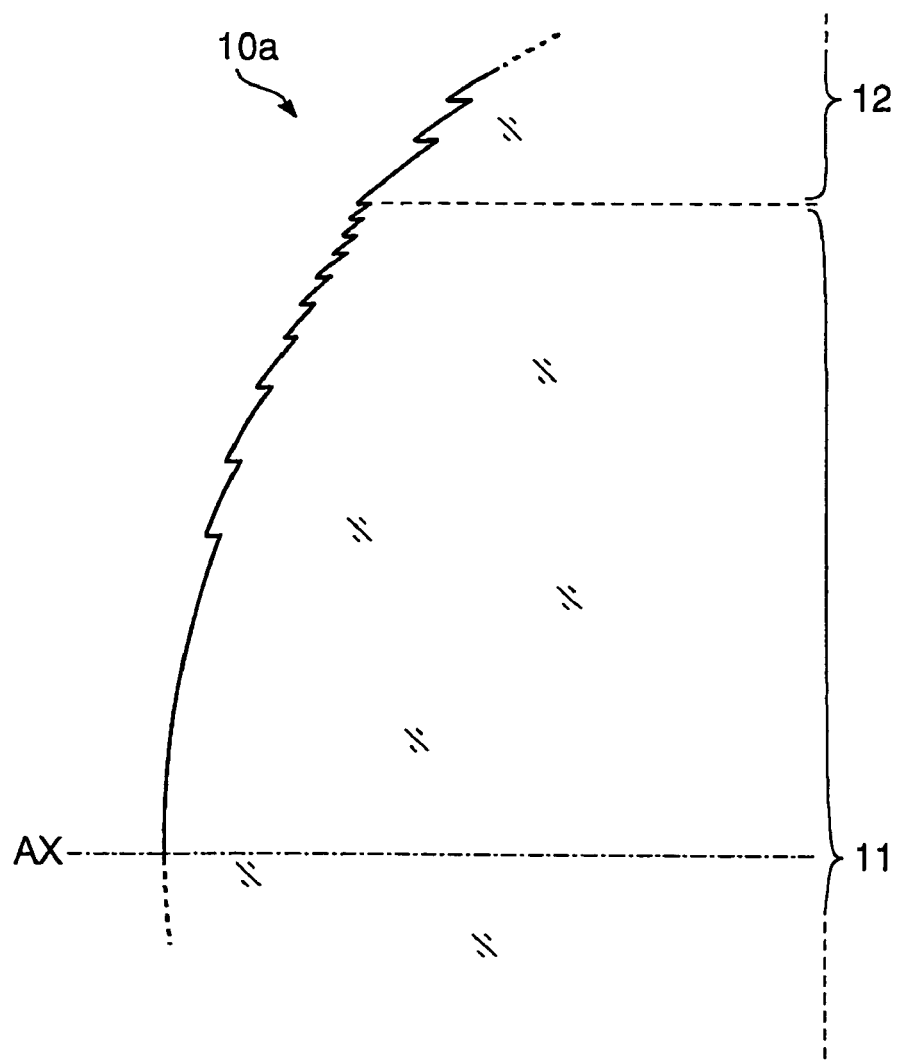
FIG. 38 is an enlarged cross-sectional view showing an example of a diffracting structure formed on at least one surface of the objective lens of the embodiment, taken along an optical axis of the objective lens.

FIG. 38 is an enlarged cross-sectional view showing an example of the diffracting structure formed on the first surface 10a of the objective lens 10, taken along the optical axis AX of the lens. The first surface 10a of the objective lens 10 has an inner area 11 around the optical axis AX and an outer area 12 around the inner area 11 extending to the perimeter of the lens. The inner area 11 and the outer area 12 have different surface configurations. The diffracting structure formed in each of the inner area 11 and outer area 12 includes a plurality of annular zones concentrically formed about the optical axis AX of the objective lens 10. As shown in FIG. 38, the diffracting structure has small steps.

The inner area 11 of the first surface 10a is provided with the diffracting structure which excellently converges the first and second laser beams on the data recording surfaces of the first and second optical discs 20A and 20B, respectively.

The outer area 12 of the first surface 10a is provided with the diffracting structure having the following characteristics. The diffracting structure has diffracting functions for excellently converging the first laser beam on the data recording surface of the first optical disc 20A while diffusing the second laser beam so as not to contribute to the formation of the beam spot on the data recording surface of the second optical disc 20B. Specifically, the diffracting structure of the outer area 12 is configured so that the wavefront of the first laser beam passing through the outer area 12 will be substantially continuous with the wavefront of the first laser beam passing through the inner area 11.

As for the second laser beam passing through the objective lens 10, only the part of the second laser beam passing through the inner area 11 is converged well on the data recording surface of the second optical disc 20B, by which the beam spot having the relatively large diameter (suitable for the recording/reproducing operation of the second optical disc 20B) is formed on the data recording surface of the second optical disc 20B. Meanwhile, the first laser beam passing through the objective lens 10 forms the beam spot having the relatively small diameter on the data recording surface of the first optical disc 20A.

Incidentally, when the objective lens 10 is formed of plastic, there is a possibility that the spherical aberration changes due to temperature variation and thereby the beam spot on the data recording surface of an optical disc is not focused well. In order to maintain high usage efficiency of the beam passing through the objective lens 10 and reduce the effect of the change in the aberration due to temperature variation, the objective lens 10 is formed so that optical path differences $\Phi 1$ and $\Phi 2$, representing the diffracting function of the objective lens 10, satisfies the following condition (3):

$$-0.35 < \frac{(\Phi 2 - \Phi 1) \times (\lambda 2 - \lambda 1)}{\{(M2 - M1) + 0.28 \times (t2 - t1)/f\} \times NA1^4} < -0.03 \qquad (3)$$

where $\Phi 1$ denotes an additional optical path length of a high order component at the innermost part of the outer area 12 of the diffracting structure of the objective lens 10, $\Phi 2$ denotes an additional optical path length of a high order component at the maximum effective radius of the diffracting structure of the objective lens 10, $\lambda 1$ denotes the wavelength of the first laser beam, $\lambda 2$ denotes the wavelength of the second laser beam, "NA1" denotes a design NA (Numerical Aperture) which is required of the objective lens 10 when the first optical disc 20A is used, t1 (mm) denotes a thickness of the first optical disc, t2 (mm) denotes a thickness of the second optical disc.

Incidentally, the an additional optical path length of a high order component Φ is expressed by the following function regarding a height h from the optical axis AX of the objective lens 10:

$$\Phi(h)=(P_4h^4+P_6h^6+P_8h^8+P_{10}h^{10}+P_{12}h^{12})\times m$$

where $P_4$, $P_6$, ... are coefficients of fourth order, sixth order, etc. concerning the additional optical path length, and m represents the diffraction order of diffracted light used for the recording or reproducing operation.

In general, in the case where the magnification of the objective lens for the recording/reproducing operation of the second optical disc 20B is positive, the aberrations caused by temperature variation in the use of the first optical disc 20A are considerably deteriorated. Therefore, it is necessary to increase the diffraction given by the diffracting structure on the objective lens 10 (i.e., it is necessary to increase the additional optical path length). The condition (3) is specified from such a viewpoint.

If the value calculated for the condition (3) exceeds the upper limit of the condition (3), the beam spot formed on the data recording surface can not be converged enough to the extent suitable for the recording/reproducing operation due to the change in the spherical aberration caused by temperature variation. On the other hand, if the value calculated for the condition (3) falls below the lower limit of the condition (3), the number of annular zones on the diffracting structure becomes too large, causing deterioration of diffraction efficiency and usage efficiency of light.

As described above, in the objective lens in accordance with the above embodiment of the present invention, the magnifications m1 and m2 are set properly depending on the types (i.e., the standards) of the optical discs, by which the coma occurring on the data recording surface can be corrected excellently for each of the optical discs of different cover layer thicknesses (i.e., the different standards).

In the following, five concrete examples according to the above mentioned embodiment will be presented. Each example describes an objective lens 10 having compatibility with a first optical disc 20A with a cover layer thickness of 0.6 mm and a second optical disc 20B with a cover layer thickness of 1.2 mm.

FIRST EXAMPLE

The objective lens 10 according to a first example is explained with reference to FIGS. 1A and 1B. FIG. 1A shows the objective lens 10 and the first optical disc 20A with regard to the optical path for the first optical disc 20A in the optical system, and FIG. 1B shows the objective lens 10 and the second optical disc 20B with regard to the optical path for the second optical disc 20B in the optical system.

Concrete specifications of the objective lens 10 of the first example will be shown in the following Table 1, and specific numerical configuration of an optical system in the optical device used for recording data to and/or reproducing data from the first and second optical discs 20A and 20B will by shown in the following Tables 2 and 3.

TABLE 1

|  | optical disc 20A | optical disc 20B |
|---|---|---|
| Design wavelength | 658 nm | 787 nm |
| Focal length | 3.059 | 3.084 |
| NA | 0.651 | 0.522 |
| magnification | 0.000 | 0.050 |

TABLE 2

| surface number | r | d | n (658 nm) | n (787 nm) |
|---|---|---|---|---|
| 0 |  | ∞ |  |  |
| 1 (h ≦ 1.52) | 1.877 | 1.85 | 1.54052 | 1.53660 |
| 1 (1.52 ≦ h) | 1.884 |  |  |  |
| 2 | −8.647 | 1.63 |  |  |
| 3 | ∞ | 0.60 | 1.57975 | 1.57319 |
| 4 | ∞ | — |  |  |

TABLE 3

| surface number | r | d | n (658 nm) | n (787 nm) |
|---|---|---|---|---|
| 0 |  | 59.00 |  |  |
| 1 (h ≦ 1.52) | 1.877 | 1.85 | 1.54052 | 1.53660 |
| 1 (1.52 ≦ h) | 1.884 |  |  |  |
| 2 | −8.647 | 1.12 |  |  |
| 3 | ∞ | 1.20 | 1.57975 | 1.57319 |
| 4 | ∞ | — |  |  |

In Table 1, the "WAVELENGTH" denotes a design wavelength [nm] optimum for the recording/reproducing operation for each optical disc, and "NA" denotes a design NA (Numerical Aperture) necessary for the recording/reproducing operation for each optical disc. In Table 1, the performance specifications are indicated with regard to each of the first laser beam (the first optical disc 20A) and the second laser beam (the second optical disc 20B). The meanings of the symbols are also applied to the following similar tables.

In Tables 2 and 3 (and in the following similar Tables), "r" represents a radius of curvature (unit: mm) of each lens surface on the optical axis. "d" represents a thickness of a lens or a distance (unit: mm) from a lens surface to a next lens surface. "n" represents a refractive index which is indicated for each of wavelengths of the first and second laser beams.

In Tables 2 and 3, "surface number" represents a surface number of each surface of optical components in the optical system. In Tables 2 and 3, a surface #0 represents the light source, and surfaces #1 and #2 represent the first surface 10a and the second surface 10b of the objective lens 10, respectively. In Table 2, surfaces #3 and #4 represent the cover layer and the data recording surface of the optical disc 20A, respectively. In Table 3, surfaces #3 and #4 represent the cover layer and the data recording layer of the optical disc 20B, respectively.

The values of "d" differ between Table 2 and Table 3 since the wavelength of the employed laser beam and the cover layer thickness differ between the first optical disc 20A and the second optical disc 20B. The values of "d" for the surface #0 is the distance measured with respect to the surface #1. As shown in Tables 2 and 3, the first surface 10a of the objective lens 10 is divided into the inner area 11 and the outer area 12 by a boundary which is defined by a height h=1.52 mm from the optical axis AX.

The first surface 10a and the second surface 10b of the objective lens 10 are aspherical surfaces. The shape of each aspherical surface 10a, 10b is expressed by the following function:

$$X(h) = \frac{ch^2}{1+\sqrt{1-(1+K)c^2h^2}} + A_4h^4 + A_6h^6 + A_8h^8 + A_{10}h^{10} + A_{12}h^{12}$$

where, X(h) represents a SAG amount which is a distance between a point on the aspherical surface at a height of h from the optical axis and a plane tangential to the aspherical surface at the optical axis, symbol C represents curvature (1/r) on the optical axis, K is a conical coefficient, and $A_4, A_6, A_8, A_{10}$ and $A_{12}$ are aspherical coefficients of fourth, sixth, eighth, tenth and twelfth orders, respectively.

The conical coefficients and the aspherical coefficients specifying each aspherical surface will be shown in the following Table 4. As shown in Tables 2-4, the surface configuration (the radius of curvature r, aspherical coefficients, etc.) differs between the inner area 11 and the outer area 12 of the first surface 10a. In Table 4 (and in the following similar Tables), a notation symbol E indicates that 10 is used as a radix and a right side value of E is used as an exponent.

conditions (1), (2) and (3), respectively. Thus, the objective lens 10 of the first example satisfies all the conditions (1) through (3).

Figure 2A:
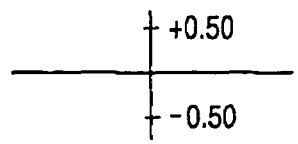
FIGS. 2A and 2B are graphs showing wavefront aberrations occurring in recording/reproducing operation of the first optical disc by use of an objective lens of a first example according to the embodiment.
Figure 2B:
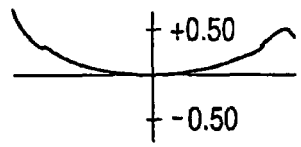
Figure 3A:
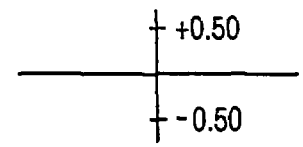
FIGS. 3A and 3B are graphs showing wavefront aberrations occurring in the recording/reproducing operation of the second optical disc by use of the objective lens of the first example.
Figure 3B:
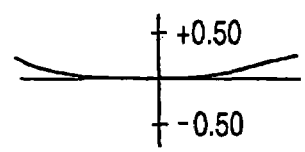

FIGS. 2A and 2B are graphs showing wavefront aberrations occurring in the recording/reproducing operation of the first optical disc 20A by use of the objective lens 10 according to the first example. FIGS. 3A and 3B are graphs showing wavefront aberrations occurring in the recording/reproducing operation of the second optical disc 20B by use of the objective lens 10 according to the first example.

Figure 4A:
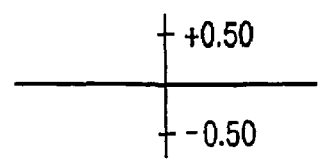
FIGS. 4A and 4B are graphs showing wavefront aberrations occurring in the recording/reproducing operation of the first optical disc by use of an objective lens of a first comparative example.
Figure 4B:
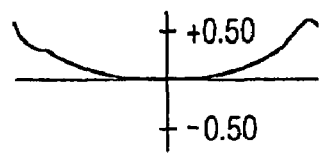
Figure 5A:
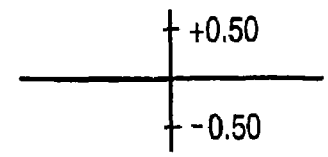
FIGS. 5A and 5B are graphs showing wavefront aberrations occurring in the recording/reproducing operation of the second optical disc by use of the objective lens of the first comparative example.
Figure 5B:
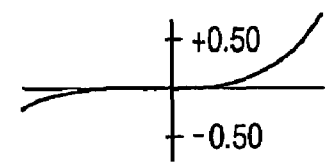

FIGS. 4A and 4B are graphs showing wavefront aberrations occurring in the recording/reproducing operation of the first optical disc 20A by use of an objective lens according to a first comparative example. FIGS. 5A and 5B are graphs showing wavefront aberrations occurring in the recording/reproducing operation of the second optical disc 20B by use of the objective lens according to the first comparative example.

Among the figures, FIGS. 2A, 3A, 4A and 5A show the wavefront aberrations on the optical axis, while FIGS. 2B, 3B, 4B and 5B show the wavefront aberrations off the optical axis (i.e., at an image height of 0.06 mm). The objective lens of the first comparative example has almost the same configuration as the objective lens 10 of the first example, except that the magnification in the use of the second optical disc 20B is set to 0. As is seen in the graphs, with the objective lens 10 of the first example satisfying all the conditions (1)-(3), the coma occurring in the recording/reproducing operation of the

TABLE 4

|  | κ | A4 | A6 | A8 | A10 | A12 |
|---|---|---|---|---|---|---|
| 1 (h ≦ 1.52) | −0.4800 | −5.9980E−03 | −4.9200E−04 | −1.3640E−04 | −9.2980E−06 | −8.3800E−06 |
| 1 (1.52 ≦ h) | −0.4800 | −6.3080E−03 | −9.3570E−06 | 7.6940E−05 | −3.0100E−05 | −6.0180E−06 |
| 2 | 0.0000 | 1.7330E−02 | −3.3210E−03 | −3.0000E−04 | 1.8350E−04 | −1.9055E−05 |

The first surface 10a of the objective ions 10 is provided with the diffracting structure. The diffracting structure is expressed by an optical path difference function Φ(h):

$$\Phi(h) = (P_2h^2 + P_4h^4 + P_6h^6 + \ldots)m\lambda$$

where $P_2$, $P_4$ and $P_6$ are coefficients of second, fourth and sixth orders, h represents a height from the optical axis, m represents a diffraction order, and λ represents a working wavelength. The optical path difference Φ(h) indicates a difference of an optical path length of a hypothetical ray of light which does not pass through the diffracting structure and an optical path length of a ray of light which is diffracted by the diffracting structure, at the height h from the optical axis. In other words, the optical path difference Φ(h) represents the additional optical path length of each ray of light which is diffracted by the diffracting structure. "m" represents the diffraction order used for the recording/reproducing operation. In this example, m is 1.

second optical disc 20B is corrected especially well in comparison with the objective lens of the first comparative example.

Figure 6:
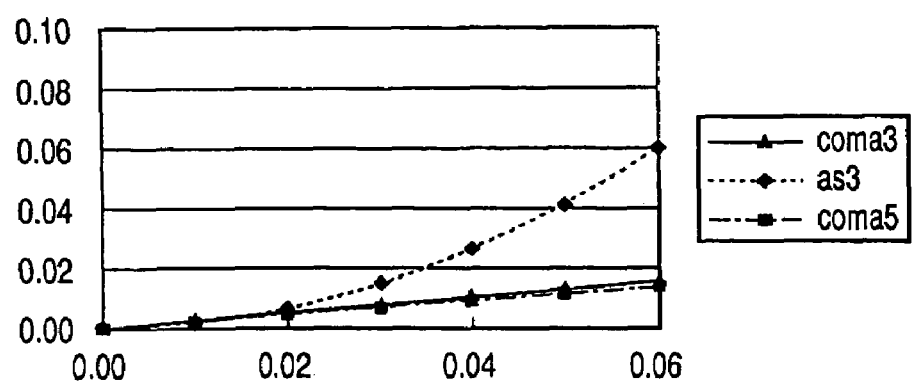
FIG. 6 is a graph showing a relationship between image height and wavefront aberration occurring in the recording/reproducing operation of the first optical disc by use of the objective lens of the first example.
Figure 7:
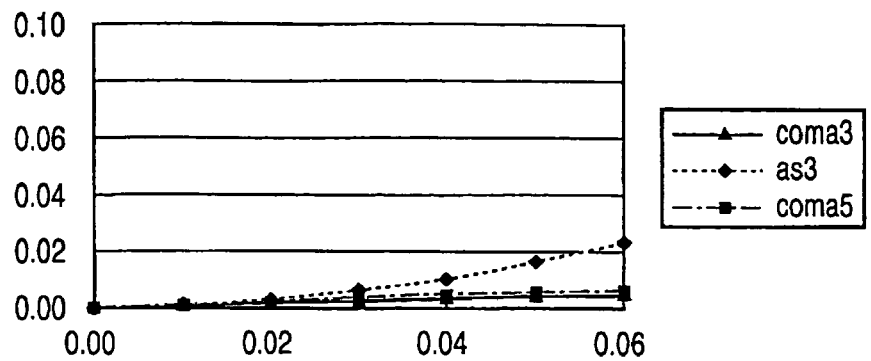
FIG. 7 is a graph showing the relationship between image height and wavefront aberration occurring in the recording/reproducing operation of the second optical disc by use of the objective lens of the first example.

The effectiveness of the coma correction attained by the objective lens 10 of the first example satisfying all the conditions (1)-(3) will be presented below more in detail. FIG. 6 is a graph showing the relationship between the image height and the wavefront aberration occurring in the recording/reproducing operation of the first optical disc 20A by use of the objective lens 10 of the first example. FIG. 7 is a graph showing the relationship between the image height and the wavefront aberration occurring in the recording/reproducing operation of the second optical disc 20B by use of the objective lens 10 of the first example.

Figure 8:
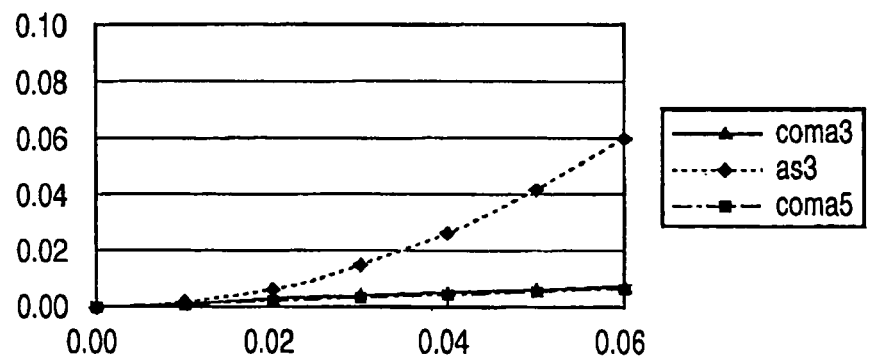
FIG. 8 is a graph showing the relationship between image height and wavefront aberration occurring in the recording/reproducing operation of the first optical disc by use of the objective lens of the first comparative example.

FIG. 8 us a graph showing the relationship between the image height and the wavefront aberration occurring in the recording/reproducing operation of the first optical disc 20A by use of the objective lens of the first comparative example.

TABLE 5

|  | P2 | P4 | P6 | P8 | P10 | P12 |
|---|---|---|---|---|---|---|
| 1 (h ≦ 1.52) | 1.6000E+00 | −4.6800E+00 | −2.0220E−01 | −4.3150E−02 | 0.0000E+00 | 0.0000E+00 |
| 1 (1.52 ≦ h) | 7.8700E−01 | −5.1110E+00 | 4.0110E−01 | 0.0000E+00 | 0.0000E+00 | 0.0000E+00 |

Figure 9:
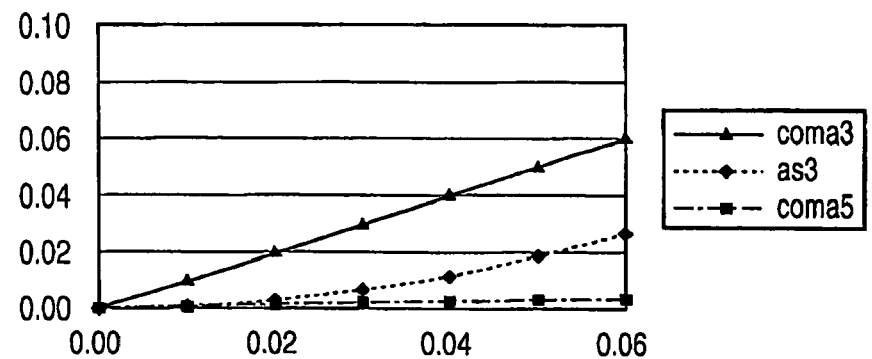
FIG. 9 is a graph showing the relationship between image height and wavefront aberration occurring in the recording/reproducing operation of the second optical disc by use of the objective lens of the first comparative example.

From the above tables, the objective lens 10 of the first example gives 0.050, 0.153 and −0.227 as the values in the FIG. 9 is a graph showing the relationship between the image height and the wavefront aberration occurring in the recording/reproducing operation of the second optical disc 20B by use of the objective lens of the first comparative example.

In each graph (and in the following similar graphs) the horizontal axis represents the image height and the vertical axis represents the amount of aberration, in which "coma3" denotes the coma of the third order, "as3" denotes astigmatism of the third order, and "coma5" denotes the coma of the fifth order.

Comparing FIG. 6 and FIG. 8 showing the amount of wavefront aberration occurring on the data recording surface of the first optical disc 20A, the coma of the third order caused by use of the objective lens 10 of the first example is reduced to a level substantially equal to a level of the coma of the third order caused by use of the objective lens of the first comparative example.

Meanwhile, comparing FIG. 7 and FIG. 9 showing the amount of wavefront aberration occurring on the data recording surface of the second optical disc 20B, the objective lens 10 of the first example is capable of suppressing the coma of the third order excellently in comparison with the objective lens of the first comparative example, by which the total amount of wavefront aberration is reduced considerably. To sum up, the objective lens 10 of the first example is capable of correcting the third order coma excellently for both types of optical discs 20A and 20B, by which the coma can be suppressed enough to the extent allowing the formation of an optimum beam spot (optimum for the recording/reproducing operation) on the data recording surface of each optical disc.

SECOND EXAMPLE

Figure 10A:
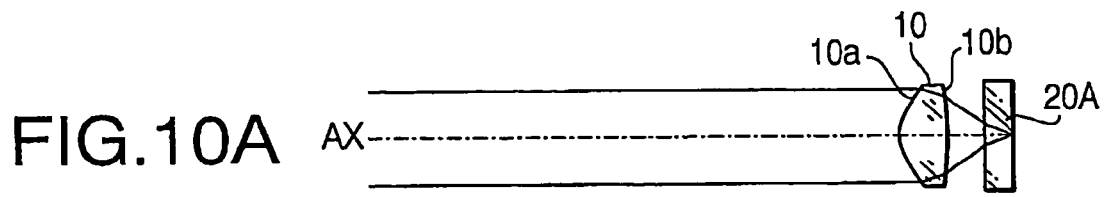
FIG. 10A shows an objective lens according to a second example and the first optical disc with regard to an optical path for the first optical disc.
Figure 10B:
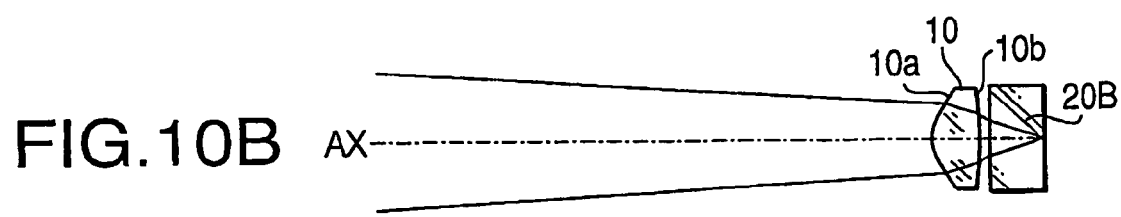
FIG. 10B shows the objective lens according to the second example and the second optical disc with regard to an optical path for the second optical disc.

The objective lens 10 according to a second example is explained with reference to FIGS. 10A and 10B. FIG. 10A shows the objective lens 10 and the first optical disc 20A with regard to an optical path for the first optical disc 20A in the optical system, and FIG. 10B shows the objective lens 10 and the second optical disc 20B with regard to an optical path for the second optical disc 20B in the optical system.

Concrete specifications of the objective lens 10 of the second example will be shown in the following Table 6, and specific numerical configuration of the optical device used for recording data to and/or reproducing data from the optical discs 20A and 20B by use of the objective lens 10 of the second example will be shown in the following Tables 7 and 8.

TABLE 6

|  | optical disc 20A | optical disc 20B |
|---|---|---|
| Design wavelength | 654 nm | 780 nm |
| Focal length | 1.800 | 1.814 |
| NA | 0.600 | 0.522 |
| magnification | 0.000 | 0.125 |

TABLE 7

| surface number | r | d | n (654 nm) | n (780 nm) |
|---|---|---|---|---|
| 0 |  | ∞ |  |  |
| 1 (h ≦ 0.82) | 1.113 | 1.04 | 1.54067 | 1.53677 |
| 1 (0.82 ≦ h) | 1.236 |  |  |  |
| 2 | −5.033 | 0.83 |  |  |
| 3 | ∞ | 0.60 | 1.58002 | 1.57346 |
| 4 | ∞ | — |  |  |

TABLE 8

| surface number | r | d | n (654 nm) | n (780 nm) |
|---|---|---|---|---|
| 0 |  | 12.80 |  |  |
| 1 (h ≦ 0.82) | 1.113 | 1.04 | 1.54067 | 1.53677 |
| 1 (0.82 ≦ h) | 1.236 |  |  |  |
| 2 | −5.033 | 0.24 |  |  |
| 3 | ∞ | 1.20 | 1.58002 | 1.57346 |
| 4 | ∞ | — |  |  |

As shown in Tables 7 and 8, the first surface 10a of the objective lens 10 is divided into the inner area 11 and the outer area 12 by a boundary which is defined by a height h=0.82 mm from the optical axis AX.

The first surface 10a and the second surface 10b of the objective lens 10 of the second example are aspherical surfaces, and thus the shape of each aspherical surface 10a, 10b is expressed by the aforementioned function X(h). The conical coefficients and the aspherical coefficients employed for the function X(h) for specifying each aspherical surface will be shown in the following Table 9.

The first surface 10a of the objective lens 10 of the second example is provided with the diffracting structure. The diffracting structure is defined by the aforementioned optical path difference function φ(h). The optical path difference function coefficients ($P_2$, . . . ) are shown in the following Table 10. As shown in Tables 7-10, the surface configuration (the radius of curvature, aspherical coefficients, etc.) differs between the inner area 11 and the outer area 12 of the first surface 10a of the objective lens 10 of the second example.

TABLE 9

|  | κ | A4 | A6 | A8 | A10 | A12 |
|---|---|---|---|---|---|---|
| 1 (h ≦ 0.82) | −0.5000 | −6.5900E−02 | −1.4590E−02 | −6.4120E−03 | −6.0040E−04 | −2.7460E−03 |
| 1 (0.82 ≦ h) | −0.5000 | 2.4560E−02 | −1.5570E−02 | −4.9700E−03 | 2.6630E−03 | −4.5860E−03 |
| 2 | 0.0000 | 8.4950E−02 | −6.0730E−02 | 1.5130E−02 | −4.0520E−03 | 1.2440E−03 |

TABLE 10

|  | P2 | P4 | P6 | P8 | P10 | P12 |
|---|---|---|---|---|---|---|
| 1 (h ≤ 0.82) | 2.0000E+00 | −5.7017E+01 | −5.1880E+00 | 0.0000E+00 | 0.0000E+00 | 0.0000E+00 |
| 1 (0.82 ≤ h) | −3.4959E−01 | 1.2720E+01 | −1.7080E+01 | 0.0000E+00 | 0.0000E+00 | 0.0000E+00 |

From the above tables, the objective lens 10 of the second example gives 0.125, 0.225 and −0.046 as the values in the conditions (1), (2) and (3), respectively. Thus, the objective lens 10 of the second example satisfies all the conditions (1)-(3).

Figure 11A:
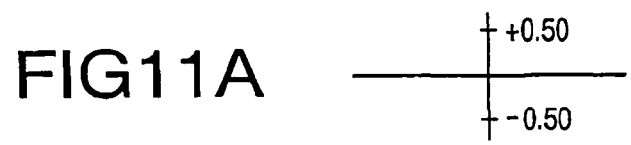
FIGS. 11A and 11B are graphs showing wavefront aberrations occurring in the recording/reproducing operation of on the first optical disc by use of the objective lens of the second example.
Figure 11B:
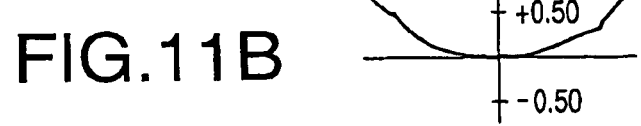
Figure 12A:
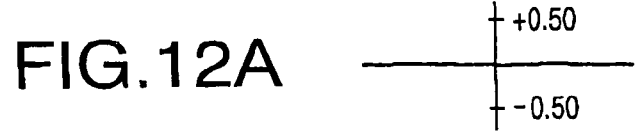
FIGS. 12A and 12B are graphs showing wavefront aberrations occurring in the recording/reproducing operation of the second optical disc by use of the objective lens of the second example.
Figure 12B:
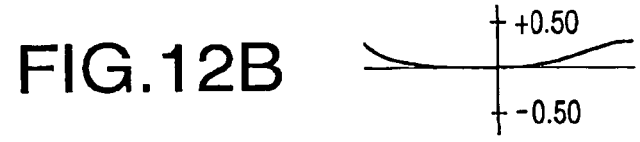

FIGS. 11A and 11B are graphs showing wavefront aberrations occurring in the recording/reproducing operation of the first optical disc 20A by use of the objective lens 10 according to the second example. FIGS. 12A and 12B are graphs showing wavefront aberrations occurring in the recording/reproducing operation of the second optical disc 20B by use of the objective lens 10 according to the second example.

Figure 13A:
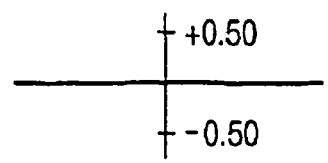
FIGS. 13A and 13B are graphs showing wavefront aberrations occurring in the recording/reproducing operation of the first optical disc by use of an objective lens of a second comparative example.
Figure 13B:
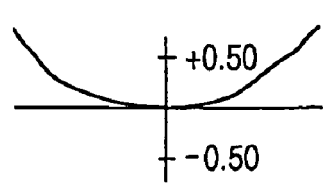
Figure 14A:
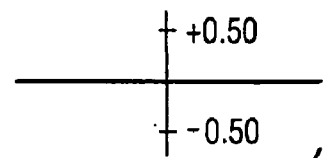
FIGS. 14A and 14B are graphs showing wavefront aberrations occurring in the recording/reproducing operation of the second optical disc by use of the objective lens of the second comparative example.
Figure 14B:
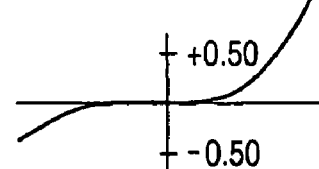

FIGS. 13A and 13B are graphs showing wavefront aberrations occurring in the recording/reproducing operation of the first optical disc 20A by use of an objective lens according to a second comparative example. FIGS. 14A and 14B are graphs showing wavefront aberrations occurring in the recording/reproducing operation of the second optical disc 20B by use of the objective lens according to the second comparative example.

Among the figures, FIGS. 11A, 12A, 13A and 14A show the wavefront aberrations on the optical axis, while FIGS. 11B, 12B, 13B and 14B show the wavefront aberrations off the optical axis (image height: 0.06 mm). The objective lens of the second comparative example has almost the same configuration as the objective lens 10 of the second example, except that the magnification in the use of the second optical disc 20B is set to 0. As is seen in the graphs, with the objective lens 10 of the second example satisfying all the conditions (1)-(3), the coma occurring in the recording/reproducing operation of the second optical disc 20B is corrected especially well in comparison with the objective lens of the second comparative example.

Figure 15:
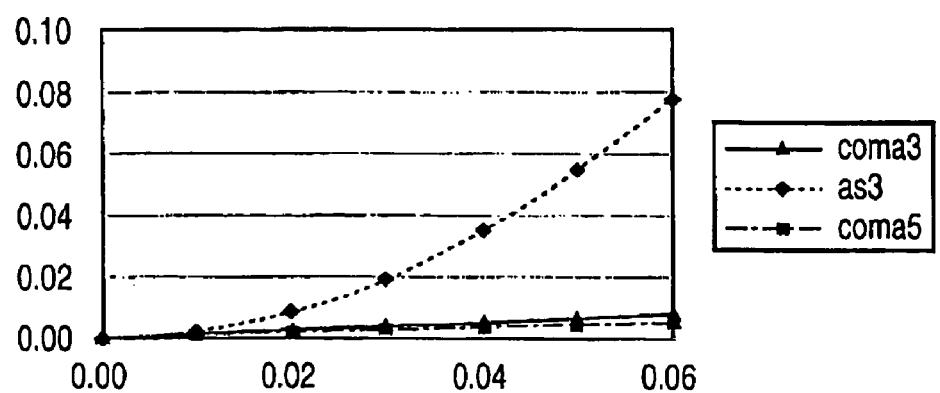
FIG. 15 is a graph showing a relationship between image height and wavefront aberration occurring in the recording/reproducing operation of the first optical disc by use of the objective lens of the second example.
Figure 16:
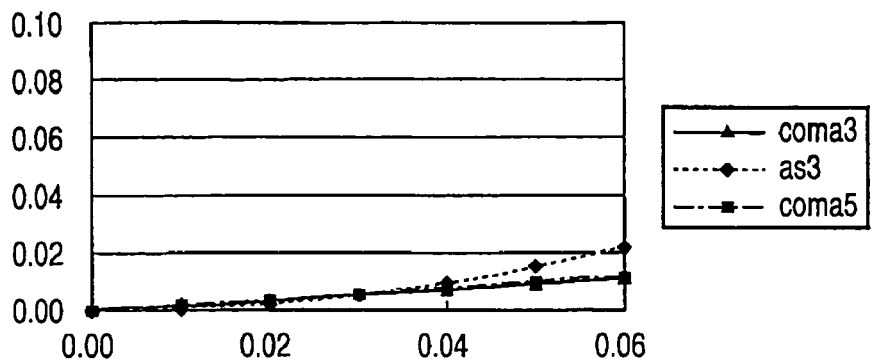
FIG. 16 is a graph showing the relationship between image height and wavefront aberration occurring in the recording/reproducing operation of the second optical disc by use of the objective lens of the second example.

The effectiveness of the coma correction attained by the objective lens 10 of the second example satisfying all the conditions (1)-(3) will be presented below more in detail. FIG. 15 is a graph showing the relationship between the image height and the wavefront aberration occurring in the recording/reproducing operation of the first optical disc 20A by use of the objective lens 10 of the second example. FIG. 16 is a graph showing the relationship between the image height and the wavefront aberration occurring in the recording/reproducing operation of the second optical disc 20B by use of the objective lens 10 of the second example.

Figure 17:
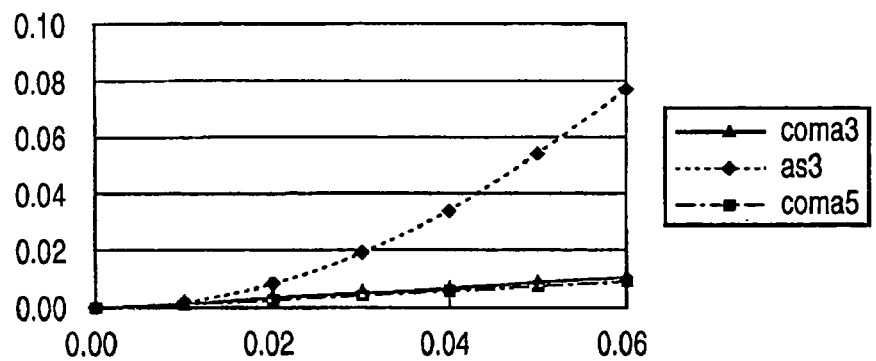
FIG. 17 is a graph showing the relationship between image height and wavefront aberration occurring in the recording/reproducing operation of the first optical disc by use of the objective lens of the second comparative example.
Figure 18:
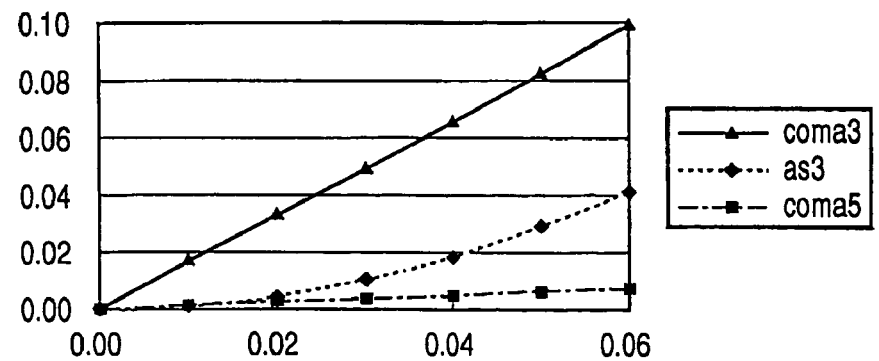
FIG. 18 is a graph showing the relationship between image height and wavefront aberration occurring in the recording/reproducing operation of the second optical disc by use of the objective lens of the second comparative example.

FIG. 17 is a graph showing the relationship between the image height and the wavefront aberration occurring in the recording/reproducing operation of the first optical disc 20A by use of the objective lens of the second comparative example. FIG. 18 is a graph showing the relationship between the image height and the wavefront aberration occurring in the recording/reproducing operation of the second optical disc 20B by use of the objective lens of the second comparative example.

Comparing FIG. 15 and FIG. 17 showing the amount of wavefront aberration occurring on the data recording surface of the first optical disc 20A, the coma of the third order caused by use of the objective lens 10 of the second example is reduced to a level substantially equal to a level of the coma of the third order caused by use of the objective lens of the second comparative example.

Meanwhile, comparing FIG. 16 and FIG. 18 showing the amount of wavefront aberration occurring on the data recording surface of the second optical disc 20B, the objective lens 10 of the second example is capable of suppressing the coma of the third order extremely well in comparison with the objective lens of the second comparative example. Therefore, by use of the objective lens 10 of the second example, the coma can be corrected excellently for both the first optical disc 20A and the second optical disc 20B.

THIRD EXAMPLE

Figure 19A:
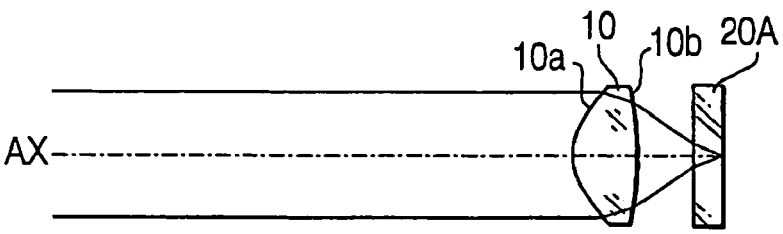
FIG. 19A shows an objective lens according to a third example and the first optical disc with regard to an optical path for the first optical disc.
Figure 19B:
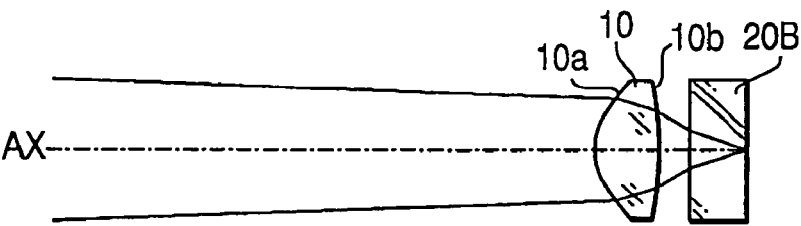
FIG. 19B shows the objective lens according to the third example and the second optical disc with regard to an optical path for the second optical disc.

The objective lens 10 according to a third example is explained with reference to FIGS. 19A and 19B. FIG. 19A shows the objective lens 10 and the first optical disc 20A with regard to an optical path for the first optical disc 20A in the optical system, and FIG. 19B shows the objective lens 10 and the second optical disc 20B with regard to an optical path for the second optical disc 20B in the optical system.

Concrete specifications of the objective lens 10 of the third example will be shown in the following Table 11, and specific numerical configuration of the optical device used for recording data to and/or reproducing data from the optical discs 20A and 20B by use of the objective lens 10 of the third example will be shown in the following Tables 12 and 13.

TABLE 11

|  | optical disc 20 A | optical disc 20 B |
|---|---|---|
| Design wavelength | 655 nm | 785 nm |
| Focal length | 2.335 | 2.355 |
| NA | 0.599 | 0.528 |
| magnification | 0.000 | 0.075 |

TABLE 12

| surface number | r | d | n (655 mm) | n (785 nm) |
|---|---|---|---|---|
| 0 |  | ∞ |  |  |
| 1 (h ≤ 1.14) | 1.436 | 1.35 | 1.54063 | 1.53665 |
| 1 (1.14 ≤ h) | 1.558 |  |  |  |
| 2 | −6.632 | 1.19 |  |  |
| 3 | ∞ | 0.60 | 1.57995 | 1.57326 |
| 4 | ∞ | — |  |  |

TABLE 13

| surface number | r | d | n (655 nm) | n (785 nm) |
|---|---|---|---|---|
| 0 |  | 29.28 |  |  |
| 1 (h ≤ 1.14) | 1.436 | 1.35 | 1.54063 | 1.53665 |
| 1 (1.14 ≤ h) | 1.558 |  |  |  |

TABLE 13-continued

| surface number | r | d | n (655 nm) | n (785 nm) |
|---|---|---|---|---|
| 2 | −6.632 | 0.65 | | |
| 3 | ∞ | 1.20 | 1.57995 | 1.57326 |
| 4 | ∞ | — | | |

As shown in Tables 12 and 13, the first surface 10a of the objective lens 10 is divided into the inner area 11 and the outer area 12 by a boundary which is defined by a height h=1.14 mm from the optical axis AX.

The first surface 10a and the second surface 10b of the objective lens 10 of the third example are aspherical surfaces, and thus the shape of each aspherical surface 10a, 10b is expressed by the aforementioned function X(h). The conical coefficients and the aspherical coefficients employed for the function X(h) for specifying each aspherical surface will be shown in the following Table 14.

The first surface 10a of the objective lens 10 of the third example is provided with the diffracting structure. The diffracting structure is defined by the aforementioned optical path difference function $\phi(h)$. The optical path difference function coefficients ($P_2$, . . . ) are shown in the following Table 15.

As shown in Tables 12-15, the surface configuration (the radius of curvature, aspherical coefficients, etc. differs between, the inner area 11 and the outer area 12 of the first surface 10a of the objective lens 10 of the third example.

TABLE 14

| | κ | A4 | A6 | A8 | A10 | A12 |
|---|---|---|---|---|---|---|
| 1 (h ≦ 1.14) | −0.6000 | −1.2960E−02 | −1.9730E−03 | −9.4370E−04 | 1.9050E−05 | −1.8410E−04 |
| 1 (1.14 ≦ h) | −0.6000 | 9.8900E−04 | 1.5760E−02 | −7.2350E−03 | 1.2200E−03 | −5.7790E−04 |
| 2 | 0.0000 | 3.9320E−02 | −1.5980E−02 | 5.0890E−04 | 1.3420E−03 | −4.3000E−04 |

TABLE 15

| | P2 | P4 | P6 | P8 | P10 | P12 |
|---|---|---|---|---|---|---|
| 1 (h ≦ 1.14) | 2.4000E+00 | −1.4970E+01 | −1.4290E+00 | −1.8870E−01 | 0.0000E+00 | 0.0000E+00 |
| 1 (1.14 ≦ h) | −2.0104E+01 | −4.2760E+00 | 1.0900E+01 | −4.7490E+00 | 0.0000E+00 | 0.0000E+00 |

From the above tables, the objective lens 10 of the third example gives 0.075, 0.175 and −0.052 as the values in the conditions (1), (2) and (3), respectively. Thus, the objective lens 10 of the third example satisfies all the conditions (1)-(3).

Figure 20A:
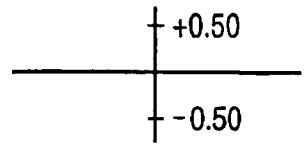
FIGS. 20A and 20B are graphs showing wavefront aberrations occurring in the recording/reproducing operation of the first optical disc by use of the objective lens of the third example.
Figure 20B:
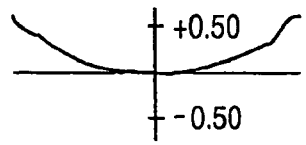
Figure 21A:
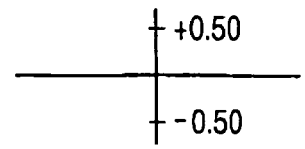
FIGS. 21A and 21B are graphs showing wavefront aberrations occurring in the recording/reproducing operation of the second optical disc by use of the objective lens of the third example.
Figure 21B:
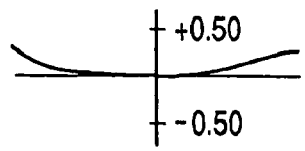

FIGS. 20A and 20B are graphs showing wavefront aberrations occurring in the recording/reproducing operation of the first optical disc 20A by use of the objective lens 10 according to the third example. FIGS. 21A and 21B are graphs showing wavefront aberrations occurring in the recording/reproducing operation of the second optical disc 20B by use of the objective lens 10 according to the third example.

Figure 22A:
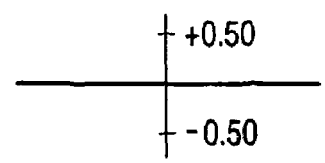
FIGS. 22A and 22B are graphs showing wavefront aberrations occurring in the recording/reproducing operation of the first optical disc by use of an objective lens of a third comparative example.
Figure 22B:
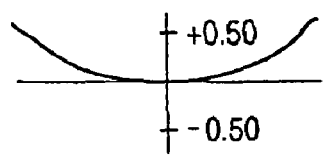
Figure 23A:
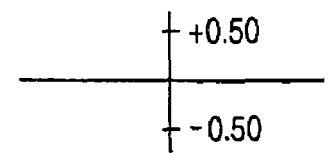
FIGS. 23A and 23B are graphs showing wavefront aberrations occurring in the recording/reproducing operation of the second optical disc by use of the objective lens of the third comparative example.
Figure 23B:
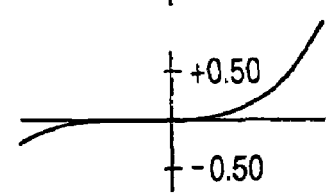

FIGS. 22A and 22B are graphs showing wavefront aberrations occurring in the recording/reproducing operation of the first optical disc 20A by use of an objective lens according to a third comparative example. FIGS. 23A and 23B are graphs showing wavefront aberrations occurring in the recording/reproducing operation of the second optical disc 20B by use of the objective lens according to the third comparative example.

Among the figures, FIGS. 20A, 21A, 22A and 23A show the wavefront aberrations on the optical axis, while FIGS. 20B, 21B, 22B and 23B show the wavefront aberrations off the optical axis (image height: 0.06 mm). The objective lens of the third comparative example has almost the same configuration as the objective lens 10 of the third example, except that the magnification in the use of the second optical disc 20B is set to 0. As is seen in the graphs, with the objective lens 10 of the third example satisfying all the conditions (1)-(3), the coma occurring in the recording/reproducing operation of the second optical disc 20B is corrected especially well in comparison with the objective lens of the third comparative example.

Figure 24:
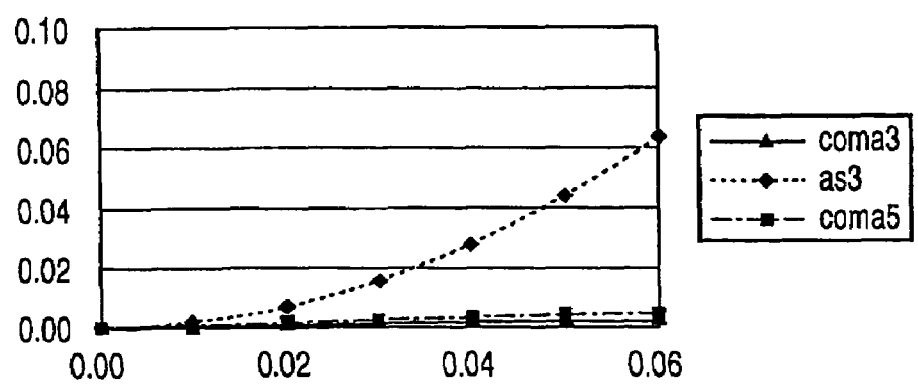
FIG. 24 is a graph showing a relationship between image height and wavefront aberration occurring in the recording/reproducing operation of the first optical disc by use of the objective lens of the third example.
Figure 25:
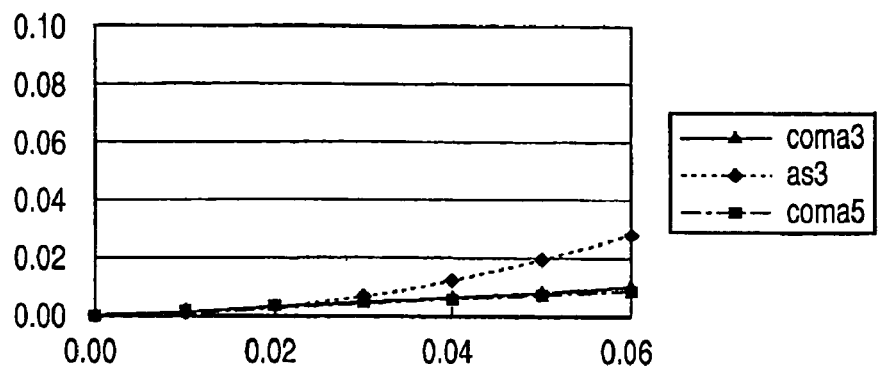
FIG. 25 is a graph showing the relationship between image height and wavefront aberration occurring in the recording/reproducing operation of the second optical disc by use of the objective lens of the third example.

The effectiveness of the coma correction attained by the objective lens 10 of the third example satisfying all the conditions (1)-(3) will be presented below more in detail. FIG. 24 is a graph showing the relationship between the image height and the wavefront aberration occurring in the recording/reproducing operation of the first optical disc 20A by use of the objective lens 10 of the third example. FIG. 25 is a graph showing the relationship between the image height and the wavefront aberration occurring in the recording/reproducing operation of the second optical disc 20B by use of the objective lens 10 of the third example.

Figure 26:
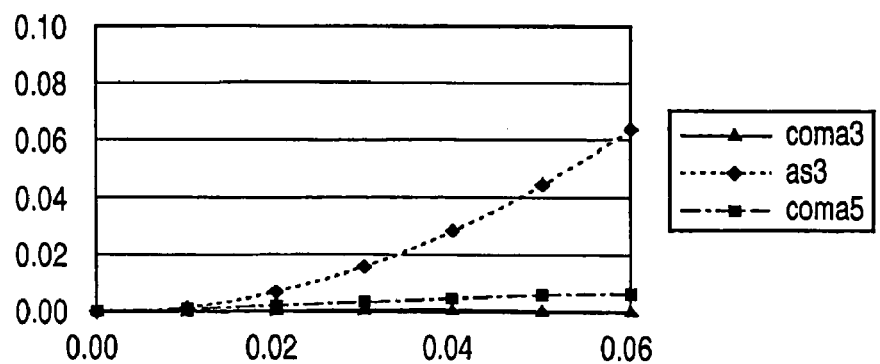
FIG. 26 is a graph showing the relationship between image height and wavefront aberration occurring in the recording/reproducing operation of the first optical disc by use of the objective lens of the third comparative example.
Figure 27:
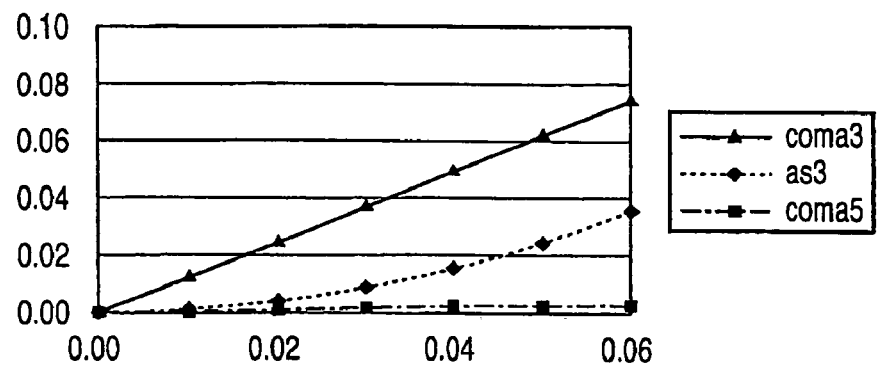
FIG. 27 is a graph showing the relationship between image height and wavefront aberration occurring in the recording/reproducing operation of the second optical disc by use of the objective lens of the third comparative example.

FIG. 26 is a graph showing the relationship between the image height and the wavefront aberration occurring in the recording/reproducing operation of the first optical disc 20A by use of the objective lens of the third comparative example. FIG. 27 is a graph showing the relationship between the image height and the wavefront aberration occurring in the recording/reproducing operation of the second optical disc 20B by use of the objective lens of the third comparative example.

Comparing FIG. 24 and FIG. 26 showing the amount of wavefront aberration occurring on the data recording surface of the first optical disc 20A, the aberrations, such as the coma of the third order, caused by use of the objective lens 10 of the third example are reduced as in the case of the objective lens of the second comparative example.

Meanwhile, comparing FIG. 25 and FIG. 27 showing the amount of wavefront aberration occurring on the data recording surface of the second optical disc 20B, the objective lens 10 of the third example is especially capable of suppressing the coma of the third order excellently in comparison with the objective lens of the third comparative example. Therefore, by use of the objective lens 10 of the third example, the coma can be corrected excellently for both the first optical disc 20A and the second optical disc 20B.

While the magnification of the objective lens 10 in the use for the first optical disc 20A is set to 0 in the above first through third examples, the objective lens in accordance with the present invention is not restricted to such a configuration as long as the aforementioned condition (1) is satisfied. Examples (fourth and fifth examples) in which the magnification of the objective lens in the use of the first optical disc 20A is set to a value smaller than 0 will be described below.

In the objective lens 10 of the fourth example, the magnification in the use for the first optical disc 20A is set smaller than 0 (that is, a diverging beam is incident on the objective lens 10) while the magnification in the use for the second optical disc 20B is set to 0 as shown in Table 16. In the objective lens 10 of the fifth example, the magnification in the use for the first optical disc 20A is set smaller than 0 while the magnification in the use for the second optical disc 20B is set larger than 0 (that is, a converging beam is incident upon the objective lens 10) as shown in Table 21.

FOURTH EXAMPLE

Figure 28A:
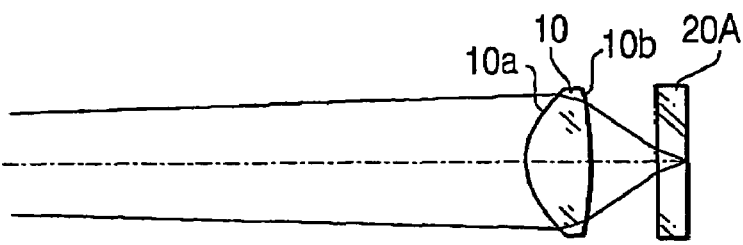
FIG. 28A shows an objective lens according to an fourth example and the first optical disc with regard to an optical path for the first optical disc.
Figure 28B:
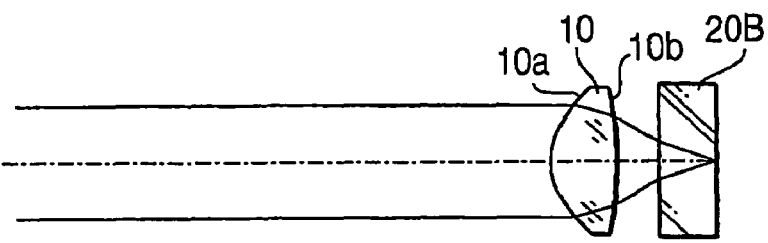
FIG. 28B shows the objective lens according to the fourth example and the second optical disc with regard to an optical path for the second optical disc 2B.

The objective lens 10 according to the fourth example is explained with reference to FIGS. 28A and 28B. FIG. 28A shows the objective lens 10 and the first optical disc 20A with regard to an optical path for the first optical disc 20A in the optical system, and FIG. 28B shows the objective lens 10 and the second optical disc 20B with regard to an optical path for the second optical disc 20B in the optical system.

Concrete specifications of the objective lens 10 of the fourth example will be shown in the following Table 16, and specific numerical configuration of the optical device used for recording data to and/or reproducing data from the optical discs 20A and 20B by use of the objective lens 10 of the fourth example will be shown in the following Tables 17 and 18.

TABLE 16

|  | optical disc 20A | optical disc 20B |
|---|---|---|
| Design wavelength | 655 nm | 785 nm |
| Focal length | 2.335 | 2.355 |
| NA | 0.599 | 0.531 |
| magnification | −0.063 | 0.000 |

TABLE 17

| surface number | r | d | n (655 nm) | n (785 nm) |
|---|---|---|---|---|
| 0 |  | −39.20 |  |  |
| 1 (h ≦ 1.25) | 1.496 | 1.35 | 1.54063 | 1.53665 |
| 1 (1.25 ≦ h) | 1.525 |  |  |  |
| 2 | −5.302 | 1.37 |  |  |
| 3 | ∞ | 0.60 | 1.57995 | 1.57326 |
| 4 | ∞ | — |  |  |

TABLE 18

| surface number | r | d | n (655 nm) | n (785 nm) |
|---|---|---|---|---|
| 0 |  | ∞ |  |  |
| 1 (h ≦ 1.25) | 1.496 | 1.35 | 1.54063 | 1.53665 |
| 1 (1.25 ≦ h) | 1.525 |  |  |  |
| 2 | −5.302 | 0.86 |  |  |
| 3 | ∞ | 1.20 | 1.57995 | 1.57326 |
| 4 | ∞ | — |  |  |

As shown in Tables 17 and 18D the first surface 10a of the objective lens 10 is divided into the inner area 11 and the outer area 12 by a boundary which is defined by a height h=1.25 nm from the optical axis AX.

The first surface 10a and the second surface 10b of the objective lens 10 of the fourth example are aspherical surfaces, and thus the shape of each aspherical surface 10a, 10b is expressed by the aforementioned function X(h). The conical coefficients and the aspherical coefficients employed for the function X(h) for specifying each aspherical surface will be shown in the following Table 19.

The first surface 10a of the objective lens 10 of the fourth example is provided with the diffracting structure. The diffracting structure is defined by the aforementioned optical path difference function Φ(h). The optical path difference function coefficients ($P_2$, . . . ) are shown in the following Table 20. As shown in Tables 17-20, the surface configuration (the radius of curvature r, aspherical coefficients, etc.) differs between the inner area 11 and the outer area 12 of the first surface 10a of the objective lens 10 of the fourth example.

TABLE 19

|  | κ | A4 | A6 | A8 | A10 | A12 |
|---|---|---|---|---|---|---|
| 1 (h ≦ 1.25) | −0.6000 | −1.2120E−02 | −1.1370E−03 | −5.5940E−04 | 1.0170E−04 | −1.1910E−04 |
| 1 (1.25 ≦ h) | −0.6000 | −5.8450E−03 | −2.3900E−03 | −6.1080E−04 | 9.4540E−04 | −2.5140E−04 |
| 2 | 0.0000 | 3.5880E−02 | −1.2540E−02 | 2.7430E−03 | −7.6050E−04 | 1.1036E−04 |

TABLE 20

|  | P2 | P4 | P6 | P8 | P10 | P12 |
|---|---|---|---|---|---|---|
| 1 (h ≦ 1.25) | 2.4000E+00 | −1.1114E+01 | −5.9580E−01 | −6.4330E−02 | 0.0000E+00 | 0.0000E+00 |
| 1 (1.25 ≦ h) | −2.8460E+00 | −5.9800E+00 | −3.0170E+00 | 1.1970E+00 | 0.0000E+00 | 0.0000E+00 |

From the above tables, the objective lens 10 of the fourth example gives 0.063, 0.147 and −0.115 as the values in the conditions (1), (2) and (3), respectively. Thus, the objective lens 10 of the fourth example satisfies all the conditions (1)-(3).

Figure 29A:
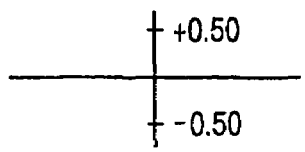
FIGS. 29A and 29B are graphs showing wavefront aberrations occurring in the recording/reproducing operation of the first optical disc by use of the objective lens of the fourth example.
Figure 29B:
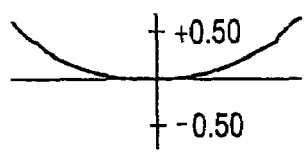
Figure 30A:
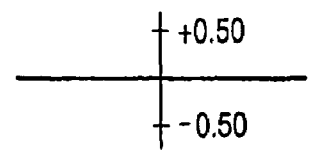
FIGS. 30A and 30B are graphs showing wavefront aberrations occurring in the recording/reproducing operation of the second optical disc by use of the objective lens of the fourth example.
Figure 30B:
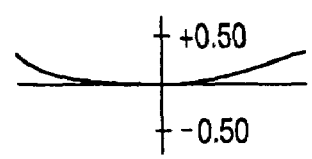

FIGS. 29A and 29B are graphs showing wavefront aberrations occurring in the recording/reproducing operation of the first optical disc 20A by use of the objective lens 10 according to the fourth example. FIGS. 30A and 30B are graphs showing wavefront aberrations occurring in the recording/reproducing operation of the second optical disc 20B by use of the objective lens 10 according to the fourth example. Among the figures, FIGS. 29A and 30A show the wavefront aberrations on the optical axis, while FIGS. 29B and 30B show the wavefront aberrations off the optical axis (image height: 0.06 mm).

As is seen in the graphs, with the objective lens 10 of the fourth example satisfying all the conditions (1)-(3), the coma occurring in the recording/reproducing operation is corrected excellently for both the first and second optical discs 20A and 20B.

Figure 31:
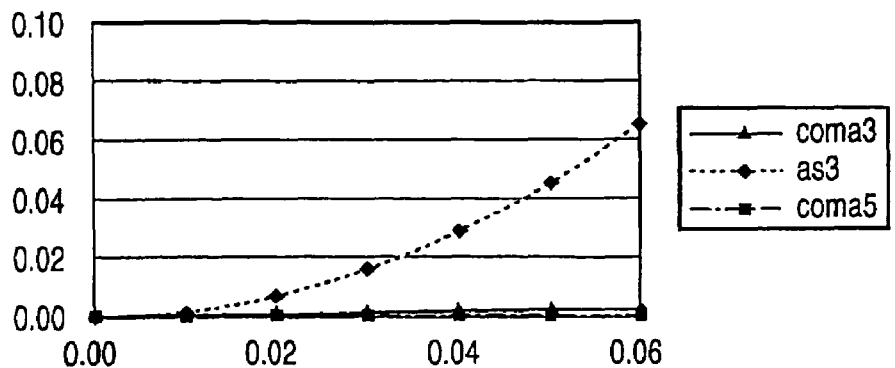
FIG. 31 is a graph showing a relationship between image height and wavefront aberration occurring in the recording/reproducing operation of the first optical disc by use of the objective lens of the fourth example.
Figure 32:
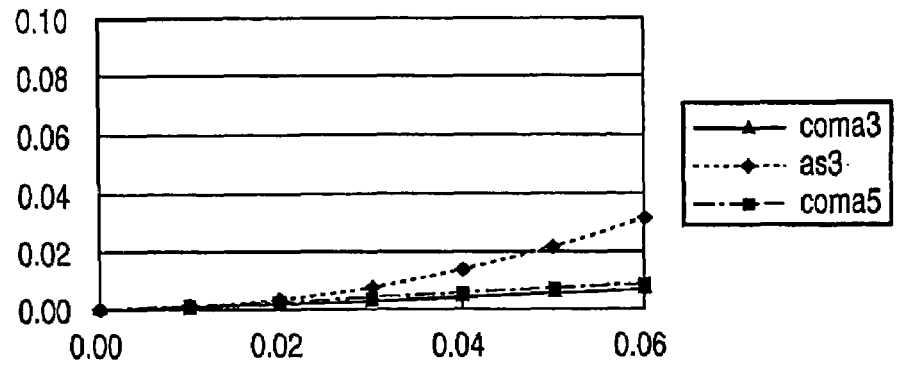
FIG. 32 is a graph showing the relationship between image height and wavefront aberration occurring in the recording/reproducing operation of the second optical disc by use of the objective lens of the fourth example.

The effectiveness of the coma correction attained by the objective lens 10 of the fourth example satisfying all the conditions (1)-(3) will be presented below more in detail. FIG. 31 is a graph showing the relationship between the image height and the wavefront aberration occurring in the recording/reproducing operation of the first optical disc 20A by use of the objective lens 10 of the fourth example. FIG. 32 is a graph showing the relationship between the image height and the wavefront aberration occurring in the recording/reproducing operation of the second optical disc 20B by use of the objective lens 10 of the fourth example. With the objective lens 10 of the fourth example, the third order coma and the fifth order coma can be corrected excellently for both the first optical disc 20A and the second optical disc 20B.

FIFTH EXAMPLE

Figure 33A:
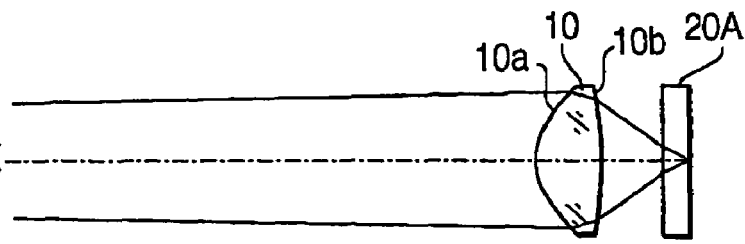
FIG. 33A shows an objective lens according to a fifth example and the first optical disc with regard to an optical path for the first optical disc.
Figure 33B:
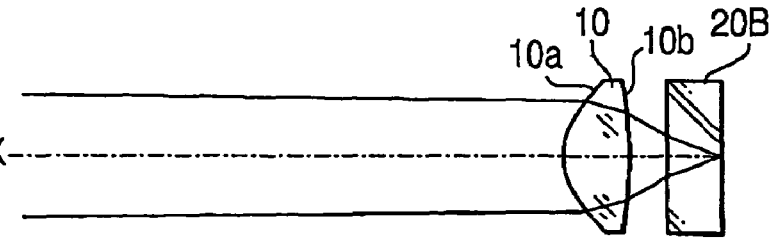
FIG. 33B shows the objective lens according to the fifth example and the second optical disc with regard to an optical path for the second optical disc.

The objective lens 10 according to the fifth example is explained with reference to FIGS. 33A and 33B. FIG. 33A shows the objective lens 10 and the first optical disc 20A with regard to an optical path for the first optical disc 20A in the optical system, and FIG. 33B shows the objective lens 10 and the second optical disc 20B with regard to an optical path for the second optical disc 20B in the optical system.

Concrete specifications of the objective lens 10 of the fifth example will be shown in the following Table 21, and specific numerical configuration of the optical device used for recording data to and/or reproducing data from the optical discs 20A and 20B by use of the objective lens 10 of the fifth example will be shown in the following Tables 22 and 23.

TABLE 21

|  | optical disc 20 A | optical disc 20 B |
|---|---|---|
| Design wave length | 655 nm | 785 nm |
| Focal length | 2.335 | 2.355 |
| NA | 0.599 | 0.511 |
| magnification | −0.035 | 0.025 |

TABLE 22

| surface number | r | d | n (655 mm) | n (785 nm) |
|---|---|---|---|---|
| 0 |  | −69.00 |  |  |
| 1 (h ≦ 1.17) | 1.475 | 1.35 | 1.54063 | 1.53665 |
| 1 (1.17 ≦ h) | 1.501 |  |  |  |
| 2 | −5.686 | 1.29 |  |  |
| 3 | ∞ | 0.60 | 1.57995 | 1.57326 |
| 4 | ∞ | — |  |  |

TABLE 23

| surface number | r | d | n (655 mm) | n (785 nm) |
|---|---|---|---|---|
| 0 |  | 92.00 |  |  |
| 1 (h ≦ 1.17) | 1.475 | 1.35 | 1.54063 | 1.53665 |
| 1 (1.17 ≦ h) | 1.501 |  |  |  |
| 2 | −5.686 | 0.79 |  |  |
| 3 | ∞ | 1.20 | 1.57995 | 1.57326 |
| 4 | ∞ | — |  |  |

As shown in Tables 22 and 23, the first surface 10a of the objective lens 10 is divided into the inner area 11 and the outer area 12 by a boundary which is defined by a height h=1.17 mm from the optical axis AX.

The first surface 10a and the second surface 10b of the objective lens 10 of the fifth example are aspherical surfaces, and thus the shape of each aspherical surface 10a, 10b is expressed by the aforementioned function X(h). The conical coefficients and the aspherical coefficients employed for the function X(h) for specifying each aspherical surface will be shown in the following Table 24.

The first surface 10a of the objective lens 10 of the fifth example is provided with the diffracting structure. The diffracting structure is defined by the aforementioned optical path difference function $\phi(h)$. The optical path difference function coefficients ($P_2$, . . . ) are shown in the following Table 25. As shown in Tables 22-25, the surface configuration (the radius of curvature, aspherical coefficients, etc.) differs between the inner area 11 and the outer area 12 of the first surface 10a of the objective lens 10 of the fifth example.

TABLE 24

|  | κ | A4 | A6 | A8 | A10 | A12 |
|---|---|---|---|---|---|---|
| 1 (h ≦ 1.17) | −0.6000 | −1.2410E−02 | 1.3150E−04 | −7.9720E−04 | −2.5440E−05 | −1.8600E−04 |
| 1 (1.17 ≦ h) | −0.6000 | 1.2200E−03 | −8.1120E−03 | 1.4430E−03 | 6.7110E−04 | −2.6390E−04 |
| 2 | 0.0000 | 3.4770E−02 | −5.5840E−03 | −4.7670E−03 | 1.9310E−03 | −2.3220E−04 |

TABLE 25

| | P2 | P4 | P6 | P8 | P10 | P12 |
|---|---|---|---|---|---|---|
| 1 (h ≦ 1.17) | 2.4000E+00 | −1.2070E+01 | −1.0310E−01 | −4.6900E−01 | 0.0000E+00 | 0.0000E+00 |
| 1 (1.17 ≦ h) | −2.4465E+00 | −1.0030E+00 | −8.2550E+00 | 2.5510E+00 | 0.0000E+00 | 0.0000E+00 |

From the above tables, the objective lens 10 of the fifth example gives 0.060, 0.140 and −0.135 as the values in the conditions (1), (2) and (3), respectively. Thus, the objective lens 10 of the fifth example satisfies all the conditions (1)-(3).

Figure 34A:
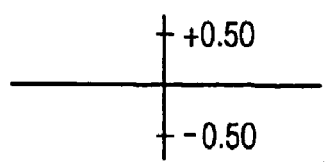
FIGS. 34A and 34B are graphs showing wavefront aberrations occurring in the recording/reproducing operation of the first optical disc by use of the objective lens of the fifth example.
Figure 34B:
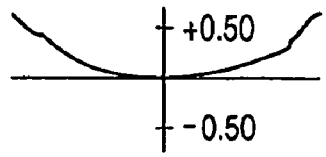
Figure 35A:
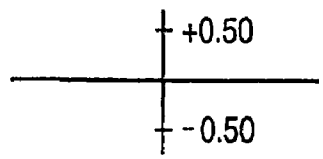
FIGS. 35A and 35B are graphs showing wavefront aberrations occurring in the recording/reproducing operation of the second optical disc by use of the objective lens of the fifth example.
Figure 35B:
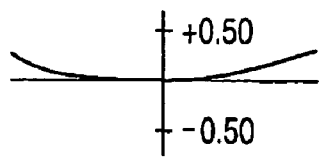

FIGS. 34A and 34B are graphs showing wavefront aberrations occurring in the recording/reproducing operation of the first optical disc 20A by use of the objective lens 10 according to the fifth example. FIGS. 35A and 35B are graphs showing wavefront aberrations occurring in the recording/reproducing operation of the second optical disc 20B by use of the objective lens 10 according to the fifth example. Among the figures, FIGS. 34A and 35A show the wavefront aberrations on the optical axis, while FIGS. 34B and 35B show the wavefront aberrations off the optical axis (image height: 0.06 mm).

As is seen in the graphs, with the objective lens 10 of the fifth example satisfying all the conditions (1)-(3), the coma occurring in the recording/reproducing operation is corrected excellently for both the first and second optical discs 20A and 20B.

Figure 36:
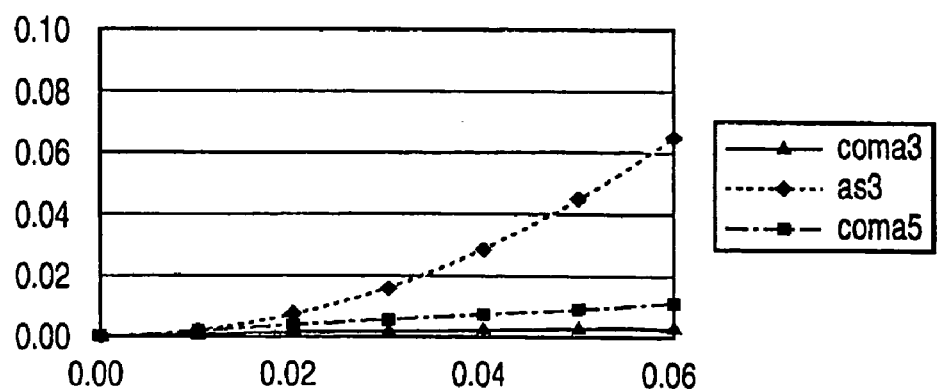
FIG. 36 is a graph showing a relationship between image height and wavefront aberration occurring in the recording/reproducing operation of the first optical disc by use of the objective lens of the fifth example.
Figure 37:
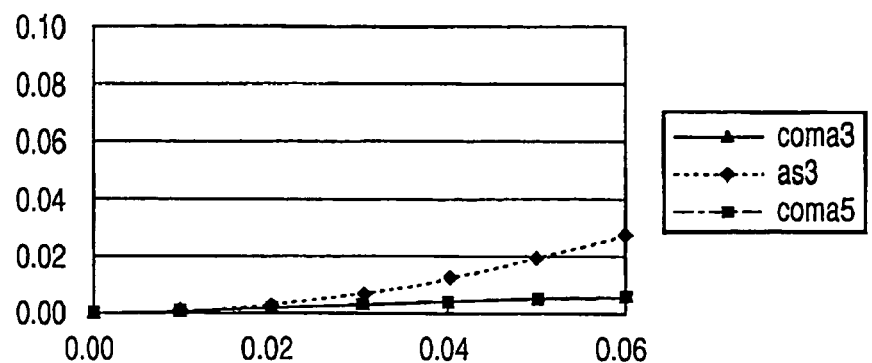
FIG. 37 is a graph showing the relationship between image height and wavefront aberration occurring in the recording/reproducing operation of the second optical disc by use of the objective lens of the fifth example.

The effectiveness of the coma correction attained by the objective lens 10 of the fifth example satisfying all the conditions (1)-(3) will be presented below more in detail. FIG. 36 is a graph showing the relationship between the image height and the wavefront aberration occurring in the recording/reproducing operation of the first optical disc 20A by use of the objective lens 10 of the fifth example. FIG. 37 is a graph showing the relationship between the image height and the wavefront aberration occurring in the recording/reproducing operation of the second optical disc 20B by use of the objective lens 10 of the fifth example. With the objective lens 10 of the fifth example, the third order coma and the fifth order coma can be corrected excellently for both the first optical disc 20A and the second optical disc 20B.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

The present disclosure relates to the subject matter contained in Japanese Patent Application No. 2003-345897, filed on Oct. 3, 2003, which is expressly incorporated herein by reference in its entirety.

What is claimed is:

1. An objective lens used for recording data to and/or reproducing data from a plurality of types of optical discs having different thicknesses of cover layers, the plurality of types of optical discs including a first optical disc and a second optical disc having a cover layer thicker than that of the first optical disc, a first light beam being used for recording or reproducing operation for the first optical disc, a second light beam being used for recording or reproducing operation for the second optical disc, a wavelength of the second light beam being longer than that of the first light beam, the objective lens satisfying a condition:

$$0.02 < M2 - M1 < 0.15 \quad (1)$$

where M1 represents a magnification of the objective lens when the recording or reproducing operation for the first optical disc is performed using the first light beam, and M2 represents a magnification of the objective lens when the recording or reproducing operation for the second optical disc is performed using the second light beam, at least one of lens surfaces of the objective lens comprising a diffracting structure having a plurality of annular zones configured to correct spherical aberrations for both of the first and second optical discs.

2. The objective lens according to claim 1, wherein the objective lens satisfies a condition:

$$0.03 < f \times (M2 - M1) < 0.43 \quad (2)$$

where f represents a focal length of the objective lens when the recording or reproducing operation for the first optical disc is performed using the first light beam.

3. The objective lens according to claim 1, wherein the at least one of lens surfaces of the objective lens includes:

an inner area for attaining a numerical aperture required for the recording or reproducing operation of the second optical disc; and an outer area for attaining a numerical aperture required for the recording or reproducing operation of the first optical disc, the outer area being located outside the inner area, wherein the diffracting structure formed on the inner and outer areas of the at least one of lens surfaces of the objective lens satisfies a condition:

$$-0.35 < \frac{(\Phi 2 - \Phi 1) \times (\lambda 2 - \lambda 1)}{\{(M2 - M1) + 0.28 \times (t2 - t1)/f\} \times NA1^4} < -0.03 \quad (3)$$

where $\Phi 1$ denotes an additional optical path length of a high order component at an innermost part of the outer area of the diffracting structure, $\Phi 2$ denotes an additional optical path length of a high order component at a maximum effective radius of the diffracting structure, $\lambda 1$ denotes the wavelength of the first light beam, $\lambda 2$ denotes the wavelength of the second light beam, NA1 denotes a design numerical aperture which is required of the objective lens when the first optical disc is used, t1 denotes a thickness of the first optical disc, t2 denotes a thickness of the second optical disc, and if denotes a focal length of the objective lens.

4. The objective lens according to claim 1, wherein the objective lens satisfies the condition (1) when a converging beam is incident thereon for the recording or reproducing operation of the second optical disc.

5. The objective lens according to claim 4, wherein the objective lens satisfies the condition (1) when a substantially collimated beam is incident thereon for the recording or reproducing operation of the first optical disc.

6. The objective lens according to claim 4,
wherein the objective lens satisfies the condition (1) when a diverging beam is incident thereon for the recording or reproducing operation of the first optical disc.

7. The objective lens according to claim 1,
wherein the objective lens satisfies the condition (1) when a diverging beam is incident thereon for the recording or reproducing operation of the first optical disc and a substantially collimated beam is incident thereon for the recording or reproducing operation of the second optical disc.

8. An optical pick-up comprising light sources and an objective lens used for recording data to and/or reproducing data from a plurality of types of optical discs having different thicknesses of cover layers, the plurality of types of optical discs including a first optical disc and a second optical disc having a cover layer thicker than that of the first optical disc, the light sources emitting a first light beam used for recording or reproducing operation for the first optical disc, and a second light beam used for recording or reproducing operation for the second optical disc, a wavelength of the second light beam being longer than that of the first light beam, the objective lens being located to satisfy a condition:

$$0.02 < M2 - M1 < 0.15 \quad (1)$$

where M1 represents a magnification of the objective lens when the recording or reproducing operation for the first optical disc is performed using the first light beam, and M2 represents a magnification of the objective lens when the recording or reproducing operation for the second optical disc is performed using the second light beam, at least one of lens surfaces of the objective lens comprising a diffracting structure having a plurality of annular zones configured to correct spherical aberrations for both of the first and second optical discs.

9. The optical pick-up according to claim 8,
wherein the objective lens satisfies a condition:

$$0.03 < f \times (M2 - M1) < 0.43 \quad (2)$$

where f represents a focal length of the objective lens when the recording or reproducing operation for the first optical disc is performed using the first light beam.

10. The optical pick-up according to claim 8,
wherein the at least one of lens surfaces of the objective lens includes:

an inner area for attaining a numerical aperture required for the recording or reproducing operation of the second optical disc; and an outer area for attaining a numerical aperture required for the recording or reproducing operation of the first optical disc, the outer area being located outside the inner area, wherein the diffracting structure formed on the inner and outer areas of the at least one of lens surfaces of the objective lens satisfies a condition:

$$-0.35 < \frac{(\Phi 2 - \Phi 1) \times (\lambda 2 - \lambda 1)}{\{(M2 - M1) + 0.28 \times (t2 - t1)/f\} \times NA1^4} < -0.03 \quad (3)$$

where $\Phi 1$ denotes an additional optical path length of a high order component at an innermost part of the outer area of the diffracting structure, $\Phi 2$ denotes an additional optical path length of a high order component at a maximum effective radius of the diffracting structure, $\lambda 1$ denotes the wavelength of the first light beam, $\lambda 2$ denotes the wavelength of the second light beam, NA1 denotes a design numerical aperture which is required of the objective lens when the first optical disc is used, t1 denotes a thickness of the first optical disc, t2 denotes a thickness of the second optical disc, and f denotes a focal length of the objective lens.

11. The optical pick-up according to claim 8,
wherein the objective lens satisfies the condition (1) when a converging beam is incident thereon for the recording or reproducing operation of the second optical disc.

12. The optical pick-up according to claim 11,
wherein the objective lens satisfies the condition (1) when a substantially collimated beam is incident thereon for the recording or reproducing operation of the first optical disc.

13. The optical pick-up according to claim 11,
wherein the objective lens satisfies the condition (1) when a diverging beam is incident thereon for the recording or reproducing operation of the first optical disc.

14. The optical pick-up according to claim 8,
wherein the objective lens satisfies the condition (1) when a diverging beam is incident thereon for the recording or reproducing operation of the first optical disc and a substantially collimated beam is incident thereon for the recording or reproducing operation of the second optical disc.

* * * * *